United States Patent
Nikai

(10) Patent No.: US 10,652,483 B2
(45) Date of Patent: May 12, 2020

(54) IMAGING ELEMENT, DRIVING METHOD OF IMAGING ELEMENT, AND ELECTRONIC DEVICE

(71) Applicant: Sony Semiconductor Solutions Corporation, Kanagawa (JP)

(72) Inventor: Norihiro Nikai, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/772,622

(22) PCT Filed: Oct. 31, 2016

(86) PCT No.: PCT/JP2016/082217
§ 371 (c)(1),
(2) Date: May 1, 2018

(87) PCT Pub. No.: WO2017/082093
PCT Pub. Date: May 18, 2017

(65) Prior Publication Data
US 2019/0028661 A1 Jan. 24, 2019

(30) Foreign Application Priority Data
Nov. 13, 2015 (JP) .................. 2015-222900

(51) Int. Cl.
*H04N 5/341* (2011.01)
*H04N 5/365* (2011.01)
(Continued)

(52) U.S. Cl.
CPC .......... *H04N 5/341* (2013.01); *H04N 5/3532* (2013.01); *H04N 5/3535* (2013.01); *H04N 5/361* (2013.01);
(Continued)

(58) Field of Classification Search
CPC ...... H04N 5/341; H04N 5/3535; H04N 5/378; H04N 5/36963; H04N 5/3658; H04N 5/361; H04N 5/3532
(Continued)

(56) References Cited

U.S. PATENT DOCUMENTS

| 2010/0097510 | A1 | 4/2010 | Wada et al. |
| 2014/0084143 | A1* | 3/2014 | Sakano ............ H01L 27/14609 250/208.1 |

(Continued)

FOREIGN PATENT DOCUMENTS

| CN | 103782587 A | 5/2014 |
| CN | 104853108 A | 8/2015 |

(Continued)

OTHER PUBLICATIONS

International Search Report and Written Opinion of PCT Application No. PCT/JP2016/082217, dated Jan. 24, 2017, 8 pages of ISRWO.

*Primary Examiner* — Lin Ye
*Assistant Examiner* — Chan T Nguyen
(74) *Attorney, Agent, or Firm* — Wolf, Greenfield & Sacks, P.C.

(57) ABSTRACT

The present technique relates to an imaging element, a driving method of the imaging element, and an electronic device that can improve image quality of an image in a case where two or more read scans of pixel signals are performed in parallel. The imaging element includes a pixel area including a plurality of pixels arranged in a matrix, a vertical drive circuit that drives the pixels in the pixel area row-by-row, and a column signal processing circuit that can read pixel signals of a plurality of rows in the pixel area in one horizontal period. The vertical drive circuit performs two or more read scans of the pixel signals in the pixel area in parallel and controls a timing of moving a read row of each (Continued)

read scan by equal to or more than a predetermined amount of movement on the basis of a position of a read row of another read scan. The present technique can be applied to, for example, a CMOS image sensor.

9 Claims, 23 Drawing Sheets

(51) Int. Cl.
  *H04N 5/353* (2011.01)
  *H04N 5/361* (2011.01)
  *H04N 5/369* (2011.01)
  *H04N 5/378* (2011.01)
(52) U.S. Cl.
  CPC ....... *H04N 5/3658* (2013.01); *H04N 5/36963* (2018.08); *H04N 5/378* (2013.01)

(58) Field of Classification Search
  USPC .......................................... 348/296
  See application file for complete search history.

(56) References Cited

U.S. PATENT DOCUMENTS

| 2014/0160334 | A1  | 6/2014 | Wakabayashi |
| 2015/0222830 | A1* | 8/2015 | Wada ................... H04N 5/3742 348/308 |
| 2015/0237247 | A1  | 8/2015 | Hara |

FOREIGN PATENT DOCUMENTS

| EP | 2755379 A1    | 7/2014 |
| JP | 2010-098516 A | 4/2010 |
| JP | 2013-055589 A | 3/2013 |
| JP | 2015-154413 A | 8/2015 |
| WO | 2013/035616 A1| 3/2013 |

* cited by examiner

IMAGING ELEMENT, DRIVING METHOD OF IMAGING ELEMENT, AND ELECTRONIC DEVICE

CROSS REFERENCE TO RELATED APPLICATIONS

This application is a U.S. National Phase of International Patent Application No. PCT/JP2016/082217 filed on Oct. 31, 2016, which claims priority benefit of Japanese Patent Application No. JP 2015-222900 filed in the Japan Patent Office on Nov. 13, 2015. Each of the above-referenced applications is hereby incorporated herein by reference in its entirety.

TECHNICAL FIELD

The present technique relates to an imaging element, a driving method of the imaging element, and an electronic device, and particularly, to an imaging element, a driving method of the imaging element, and an electronic device suitable for use in a case of performing two or more read scans of pixel signals in parallel.

BACKGROUND ART

In the past, an imaging element that can read pixel signals of a plurality of rows in one horizontal period has been proposed (for example, see PTL 1). Furthermore, when the pixel signals of a plurality of rows can be read in one horizontal period, two or more read scans of the pixel signals can also be performed in parallel, for example.

CITATION LIST

Patent Literature

[PTL 1]
JP 2013-55589A

SUMMARY

Technical Problem

However, when a read row of a read scan significantly moves in the case of performing two or more read scans of the pixel signals in parallel, the voltage of a pixel power source in a read row of another read scan significantly fluctuates, and this may generate noise in the image.

The present technique has been made in view of the circumstances, and the present technique is designed to improve image quality of an image in a case of performing two or more read scans of pixel signals in parallel.

Solution to Problem

A first aspect of the present technique provides an imaging element including a pixel area including a plurality of pixels arranged in a matrix, a vertical drive circuit that drives the pixels in the pixel area row-by-row, and a column signal processing circuit that can read pixel signals of a plurality of rows in the pixel area in one horizontal period. The vertical drive circuit performs two or more read scans of the pixel signals in the pixel area in parallel and controls a timing of moving a read row of each read scan by equal to or more than a predetermined amount of movement on the basis of a position of a read row of another read scan.

The vertical drive circuit can control the movement of the read row of each read scan by equal to or more than the predetermined amount of movement to perform the movement in a case where the read row of the other read scan is not in one of a first area used for an image in the pixel area and a second area used to detect a black level or in a case where a distance between the read row before the movement and the read row of the other read scan and a distance between the read row after the movement and the read row of the other read scan are substantially equal.

A third area for adjusting a read load of the pixel signals can be arranged on each of both sides of the first area in the pixel area in a column direction, and the vertical drive circuit can select, from the third areas, a destination of the read row of each read scan in a case of adjusting the read load of the pixel signals, on the basis of the position of the read row of the other read scan.

A fourth area not used for the image can be arranged between the first area and each of the third areas, and the vertical drive circuit can control the read scan in the fourth areas to perform the read scan faster than the read scan in the first area.

The second area can be arranged on each of both sides of the first area in the pixel area in the column direction, and the vertical drive circuit can select an area to be used to detect the black level of each read scan from the second areas on the basis of the position of the read row of the other read scan.

The vertical drive circuit can perform a plurality of times of exposure with different exposure time periods in one vertical period and control read scans of a plurality of pixel signals obtained by the plurality of times of exposure to perform the read scans in parallel.

The vertical drive circuit can perform long-time exposure and short-time exposure in one vertical period, control a read scan of pixel signals obtained by the long-time exposure and a read scan of pixel signals obtained by the short-time exposure to perform the read scans in parallel, and control a timing of movement of a read row of one of the read scans by equal to or more than a predetermined amount of movement on the basis of a position of a read row of the other read scan.

A plurality of vertical signal lines can be wired to each column in the pixel area, and the column signal processing circuit can include, in each column of the pixel area, one or more AD converters that can be individually connected to the plurality of vertical signal lines.

A plurality of vertical signal lines can be wired to each column in the pixel area, and the column signal processing circuit can include, in each of the vertical signal lines, AD converters that can operate in parallel.

The first aspect of the present technique provides a driving method of an imaging element, the driving method including performing two or more read scans of pixel signals in a pixel area in parallel, the pixel area including a plurality of pixels arranged in a matrix, and controlling a timing of moving a read row of each read scan by equal to or more than a predetermined amount of movement on the basis of a position of a read row of another read scan.

A second aspect of the present technique provides an electronic device including an imaging element including a pixel area including a plurality of pixels arranged in a matrix, a vertical drive circuit that drives the pixels in the pixel area row-by-row, and a column signal processing circuit that can read pixel signals of a plurality of rows in the pixel area in one horizontal period. The vertical drive circuit performs two or more read scans of the pixel signals in the pixel area in parallel and controls a timing of moving a read row of each read scan by equal to or more than a predetermined amount of movement on the basis of a position of a read row of another read scan.

In the first aspect or the second aspect of the present technique, two or more read scans of the pixel signals in the pixel area including a plurality of pixels arranged in a matrix are performed in parallel, and the timing of moving the read row of each read scan by equal to or more than the predetermined amount of movement is controlled on the basis of the position of the read row of another read scan.

Advantageous Effect of Invention

According to the first aspect or the second aspect of the present technique, image quality of an image is improved in a case of performing two or more read scans of pixel signals in parallel.

Note that the advantageous effect described here may not be limited, and the advantageous effect may be any of the advantageous effects described in the present disclosure.

DESCRIPTION OF EMBODIMENTS

Hereinafter, modes for carrying out the present technique (hereinafter, referred to as embodiments) will be described. Note that the embodiments will be described in the following order.
1. Configuration Example of Imaging Element
2. Cause of Generation of Noise
3. First Embodiment (Case of Scanning in Forward Direction)
4. Second Embodiment (Case of Scanning in Reverse Direction)
5. Third Embodiment (Case of Address Jump During Reading of Validity Unquestioned Area)
6. Fourth Embodiment (Case of Address Jump During Reading of Valid Pixel Area)
7. Fifth Embodiment (Case 1 of Providing Cut-Out Area)
8. Sixth Embodiment (Case 2 of Providing Cut-Out Area)
9. Seventh Embodiment (Case of Fast Scanning in Cut-Out Area)
10. Modifications 1. Configuration Example of Imaging Element First, a configuration example of an imaging element used in each embodiment of the present technique will be described with reference to FIGS. 1 to 4.
{Configuration Example of Imaging Element 10}

Figure 1:
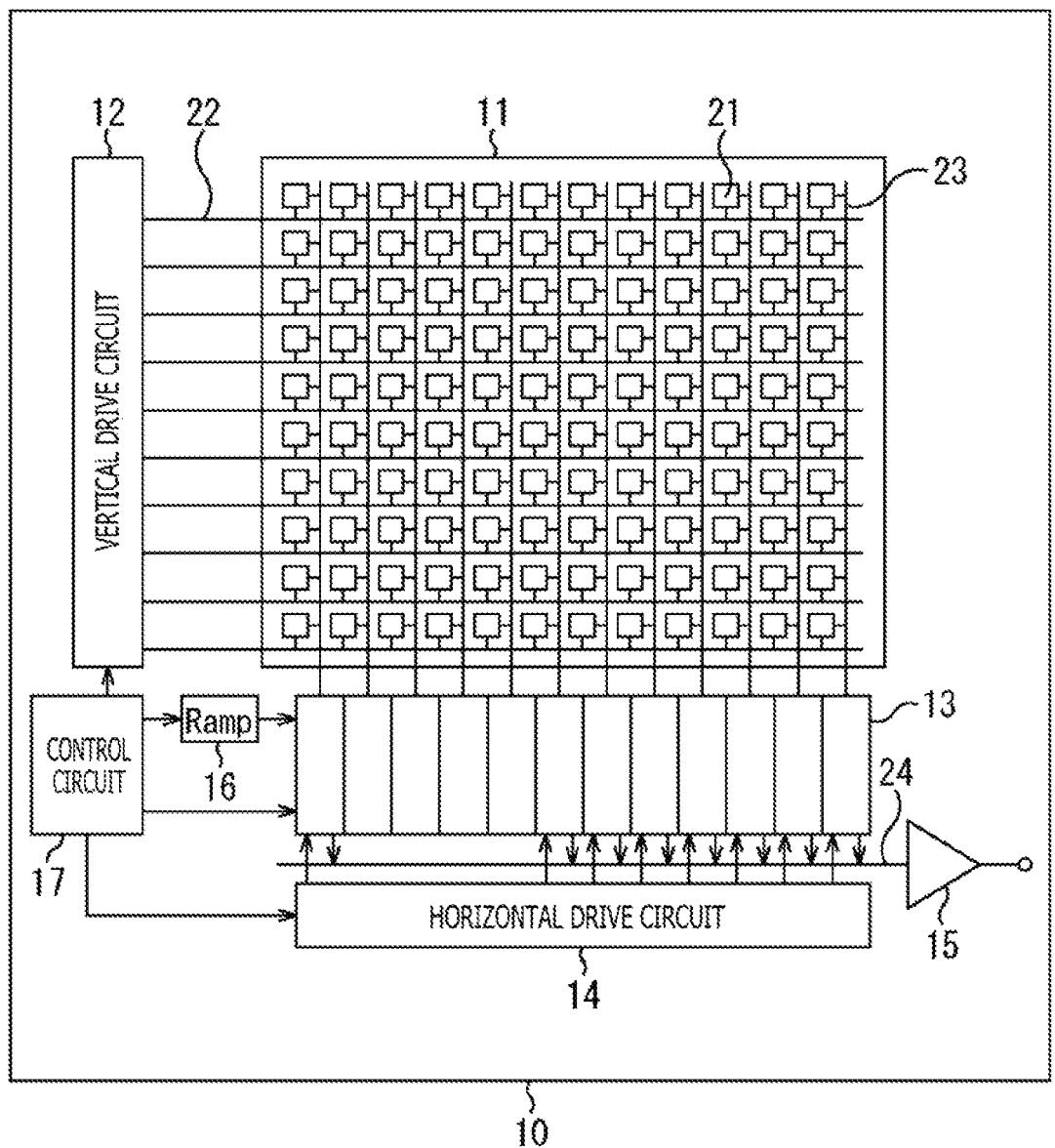
FIG. 1 is a block diagram illustrating a configuration example of an embodiment of an imaging element according to the present technique.

FIG. 1 is a block diagram illustrating a configuration example of an imaging element 10 according to the present technique.

As illustrated in FIG. 1, the imaging element 10 includes a pixel area 11, a vertical drive circuit 12, a column signal processing circuit 13, a horizontal drive circuit 14, an output circuit 15, a ramp signal generation circuit 16, and a control circuit 17.

The pixel area 11 is a light receiving surface for receiving light condensed by an optical system not illustrated. The pixel area 11 includes a plurality of pixels 21 arranged in a matrix, and the respective pixels 21 are connected row-by-row to the vertical drive circuit 12 through horizontal signal lines 22 and connected column-by-column to the column signal processing circuit 13 through vertical signal lines 23. The plurality of pixels 21 output pixel signals in levels according to amounts of received light, individually, and an image of a subject to be formed in the pixel area 11 is constructed from the pixel signals.

For each row of the plurality of pixels 21 arranged in the pixel area 11, the vertical drive circuit 12 sequentially supplies drive signals for driving (such as transferring, selecting, and resetting) the respective pixels 21 to the pixels 21 through the horizontal signal lines 22. For example, the vertical drive circuit 12 controls an exposure time period, a read scan, and the like of each pixel 21 in the pixel area 11. Furthermore, for example, the vertical drive circuit 12 performs, in parallel, a plurality of read scans of the pixel signals of the pixels 21 in the pixel area 11 as described later and controls the timing of moving the read row of each read scan on the basis of the position of the read row of another read scan.

The column signal processing circuit 13 applies CDS (Correlated Double Sampling) processing to the pixel signals output from the plurality of pixels 21 through the vertical signal lines 23 to perform AD conversion of the pixel signals and remove reset noise. For example, the column signal processing circuit 13 includes a plurality of column processing units 51 (FIG. 3) corresponding to the number of columns of the pixels 21, and the column signal processing circuit 13 can apply, in parallel, the CDS processing to the columns of the pixels 21.

For each column of the plurality of pixels 21 arranged in the pixel area 11, the horizontal drive circuit 14 sequentially supplies the column signal processing circuit 13 with drive signals for outputting the pixel signals from the column signal processing circuit 13 to an output signal line 24.

The output circuit 15 amplifies the pixel signals supplied from the column signal processing circuit 13 through the output signal line 24 at timings according to the drive signals of the horizontal drive circuit 14 and outputs the pixel signals to a signal processing circuit in a later stage.

The ramp signal generation circuit (Ramp) 16 generates a ramp signal of a voltage (slope voltage) that drops at a certain gradient with a lapse of time, the ramp signal serving as a reference signal referenced in the AD conversion of the pixel signals by the column signal processing circuit 13. The ramp signal generation circuit 16 supplies the ramp signal to the column signal processing circuit 13.

The control circuit 17 controls the drive of each component in the imaging element 10. For example, the control circuit 17 generates a clock signal according to the drive cycle of each component and supplies the clock signal to each component.

{Configuration Example of Pixel Area 11}

Figure 2:
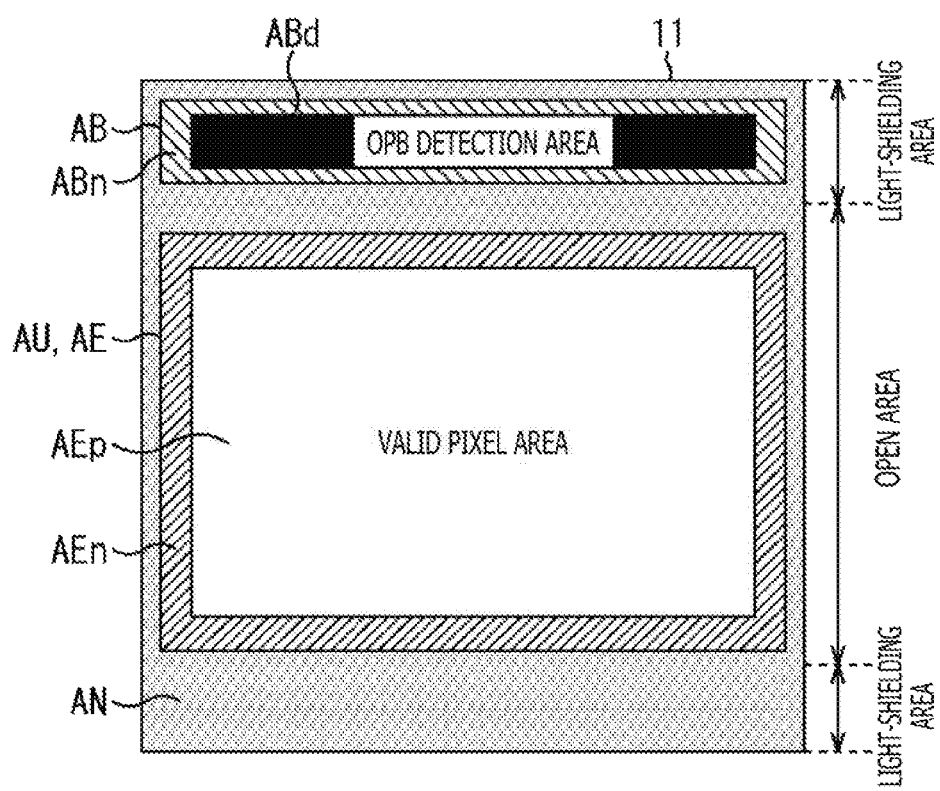
FIG. 2 depicts a configuration example of a pixel area.

FIG. 2 illustrates a configuration example of the pixel area 11 of the imaging element 10.

Light-shielding areas shielded to prevent light from entering are arranged on an upper end and a lower end of the pixel area 11, and an open area not shielded is arranged between the upper and lower light-shielding areas.

A usable area AU that can be used to generate an image is arranged in the open area. A valid area AE, from which the pixel signals are read to generate the image, is also arranged in the usable area AU. Although the usable area AU and the valid area AE coincide in the illustrated example, the valid area AE becomes narrower than the usable area AU in a case where a cut-out area is set as described later with reference to FIG. 14 and the like.

Furthermore, the valid area AE is divided into a rectangular valid pixel area AEp and a validity unquestioned area AEn surrounding the valid pixel area AEp. The valid pixel area AEp is an area where the read pixel signals are used for the image. On the other hand, the validity unquestioned area AEn is an area where the read pixel signals are not used for the image. The validity unquestioned area AEn mainly plays a role of ensuring the uniformity of the characteristics of the pixel signals in the valid pixel area AEp.

An OPB (optical black) area AB used to read black level signals that are pixel signals indicating the black level of the image is arranged in the upper light-shielding area. Furthermore, the OPB area AB1 is divided into a rectangular OPB detection area ABd and an OPB unquestioned area ABn surrounding the OPB detection area ABd. The OPB detection area ABd is an area where the read black level signals are used to detect the black level. On the other hand, the OPB unquestioned area ABn is an area where the read black level signals are not used to detect the black level. The OPB unquestioned area ABn plays a role of, for example, ensuring the uniformity of the characteristics of the pixel signals (black level signals) of the OPB detection area ABd.

Note that as described later with reference to FIG. 10 and the like, the OPB area is also arranged in the lower light-shielding area in some cases.

An area other than the valid area AE and the OPB area AB of the pixel area 11 surrounding the valid area AE and the OPB area AB is an invalid area AN. The invalid area AN is provided with, for example, a dummy area that is an area used to adjust the read load.

As described later, a plurality of read scans are performed in parallel in the pixel area 11. If, for example, reading of the pixel signals is stopped in a read scan A in a case where the pixel signals of the valid area AE and the OPB area AB are not read, the voltage of the pixel power source of the read row in another read scan significantly fluctuates. The pixel signals of the dummy area are read in the read scan A to adjust the read load to reduce the voltage fluctuation of the pixel power source.

Note that the dummy area may be provided in either one of the open area and the light-shielding area or may be provided across both areas of the open area and the light-shielding area.

In addition, the validity unquestioned area AEn, the OPB unquestioned area ABn, and the invalid area AN have in common that the areas are not used for the image (hereinafter, also referred to as unused areas).

{Configuration Example of Pixels 21 and Column Processing Unit 51}

Figure 3:
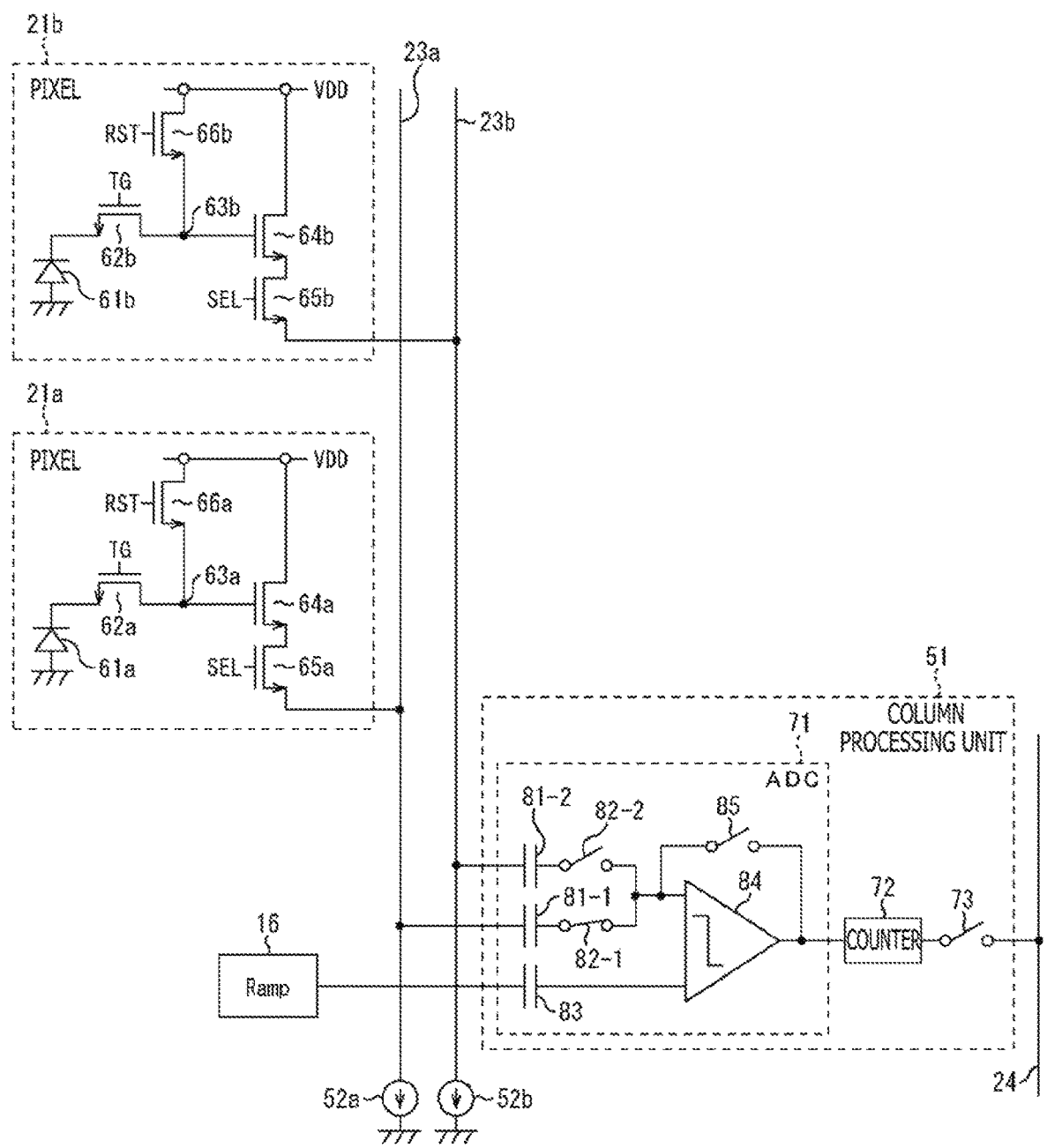
FIG. 3 is a block diagram illustrating a first configuration example of pixels and a column processing unit.

FIG. 3 illustrates a configuration example of the pixels 21 and the column processing unit 51 of the imaging element 10.

FIG. 3 illustrates two pixels 21a and 21b arranged in different rows of the same column among the plurality of pixels 21 arranged in the pixel area 11 of FIG. 1. FIG. 3 also illustrates the column processing unit 51 arranged in association with the column among the plurality of column processing units 51 included in the column signal processing circuit 13.

In the example, two vertical signal lines, that is, a first vertical signal line 23a and a second vertical signal line 23b, are provided for one column of the pixels 21. The pixel 21a (for example, pixel 21 of an odd row) is connected to the first vertical signal line 23a, and the pixel 21b (for example, pixel 21 of an even row) is connected to the second vertical signal line 23b. In addition, a constant current source 52a of a source follower circuit is connected to the first vertical signal line 23a, and a constant current source 52b of a source follower circuit is connected to the second vertical signal line 23b. Furthermore, the first vertical signal line 23a and the second vertical signal line 23b are connected to one column processing unit 51 arranged in association with the column.

The pixel 21a includes a photodiode (PD) 61a, a transfer transistor 62a, a floating diffusion (FD) unit 63a, an amplifier transistor 64a, a selection transistor 65a, and a reset transistor 66a.

The PD 61a is a photoelectric conversion unit that converts incident light into charge through photoelectric conversion and accumulates the charge. An anode terminal is grounded, and a cathode terminal is connected to the transfer transistor 62a.

The transfer transistor 62a is driven according to a transfer signal TG supplied from the vertical drive circuit 12, and once the transfer transistor 62a is turned on, the charge accumulated in the PD 61a is transferred to the FD unit 63a.

The FD unit 63a is a floating diffusion area connected to a gate electrode of the amplifier transistor 64a and having a predetermined accumulation capacity, and the FD unit 63a accumulates the charge transferred from the PD 61a.

The amplifier transistor 64a outputs a pixel signal in a level corresponding to the charge accumulated in the FD unit 63a (that is, potential of the FD unit 63a) to the first vertical signal line 23a through the selection transistor 65a. Therefore, the FD unit 63a is connected to the gate electrode of the amplifier transistor 64a, and the FD unit 63a and the amplifier transistor 64a function as a conversion unit that converts the charge generated by the PD 61a into the pixel signal in the level corresponding to the charge.

The selection transistor 65a is driven according to a selection signal SEL supplied from the vertical drive circuit 12, and once the selection transistor 65a is turned on, the pixel signal output from the amplifier transistor 64a can be output to the first vertical signal line 23a.

The reset transistor 66a is driven according to a reset signal RST supplied from the vertical drive circuit 12, and once the reset transistor 66a is turned on, the charge accumulated in the FD unit 63a is discharged to a pixel power source VDD, and the FD unit 63a is reset.

Furthermore, as in the pixel 21a, the pixel 21b includes a PD 61b, a transfer transistor 62b, an FD unit 63b, an amplifier transistor 64b, a selection transistor 65b, and a reset transistor 66b. Therefore, the components of the pixel 21b operate similarly to the components of the pixel 21a as described above, and the detailed description will not be repeated.

Note that, when appropriate, the pixel 21a and the pixel 21b will be simply referred to as pixels 21 in the case where the pixel 21a and the pixel 21b do not have to be distinguished, and the components of the pixels 21 will also be referred to in a similar way.

The column processing unit 51 includes an AD converter (ADC) 71, a counter 72, and an output switch 73. The ADC 71 includes capacitors 81-1 and 81-2, input switches 82-1 and 82-2, a capacitor 83, a comparator 84, and a feedback switch 85.

An input terminal on a negative side of the comparator 84 is connected to the first vertical signal line 23a through the capacitor 81-1 and the input switch 82-1 and connected to the second vertical signal line 23b through the capacitor 81-2 and the input switch 82-2. In addition, an input terminal on a positive side of the comparator 84 is connected to the ramp signal generation circuit 16 through the capacitor 83. Furthermore, an output terminal of the comparator 84 and the input terminal on the negative side are connected through the feedback switch 85.

The input switches 82-1 and 82-2 open and close according to control of the control circuit 17 of FIG. 1 and connect the input terminal on the negative side of the comparator 84 to one or both the first vertical signal line 23a and the second vertical signal line 23b. For example, when the input switch 82-1 is turned on (closed), and the input switch 82-2 is turned off (opened), the input terminal on the negative side of the comparator 84 is connected to the first vertical signal line 23a, and the pixel signal output from the pixel 21a is input to the comparator 84. On the other hand, when the input switch 82-2 is turned on, and the input switch 82-1 is turned off, the input terminal on the negative side of the comparator 84 is connected to the second vertical signal line 23b, and the pixel signal output from the pixel 21b is input to the comparator 84. In this way, the ADC 71 can be separately connected to the vertical signal lines 23a and 23b through the input switches 82-1 and 82-2.

The comparator 84 compares the magnitude of a ramp signal input to the input terminal on the positive side and the magnitude of a pixel signal input to the input terminal on the negative side and outputs a comparison result signal indicating the comparison result. For example, the comparator 84 outputs a comparison result signal in a high level in a case where the ramp signal is larger than the analog pixel signal and outputs a comparison result signal in a low level in a case where the ramp signal is equal to or smaller than the analog pixel signal.

The counter 72 counts, for example, a predetermined number of clocks from the timing of the start of a drop in the potential of the ramp signal output from the ramp signal generation circuit 16 at a certain gradient to the timing of the switch of the comparison result signal output from the comparator 84 from the high level to the low level. Therefore, the count value counted by the counter 72 becomes a value corresponding to the level of the pixel signal input to the comparator 84, and as a result, the analog pixel signal output from the pixel 21 is converted into a digital value.

For example, in the imaging element 10, a pixel signal in a reset level in a state that the FD unit 63 of the pixel 21 is reset and a pixel signal in a signal level in a state that the FD unit 63 of the pixel 21 holds the charge photoelectrically converted by the PD 61 are output from the pixel 21. A difference between the signals is obtained in the AD conversion of the pixel signal by the column processing unit 51, and the pixel signal is output after removal of reset noise.

In addition, the counter 72 includes a holding unit (not illustrated) that holds the count value, and the counter 72 can temporarily hold the count value.

The output switch 73 opens and closes according to a drive signal output from the horizontal drive circuit 14. For example, the output switch 73 is turned on according to the drive signal output from the horizontal drive circuit 14 at the timing of output of a pixel signal in the column provided with a predetermined column processing unit 51, and an output terminal of the counter 72 is connected to the output signal line 24. As a result, a pixel signal after AD conversion by the column processing unit 51 is output to the output signal line 24.

{Reading Method of Pixel Signals}

Next, an example of a reading method of the pixel signals of the imaging element 10 will be described with reference to FIG. 4.

Figure 4:
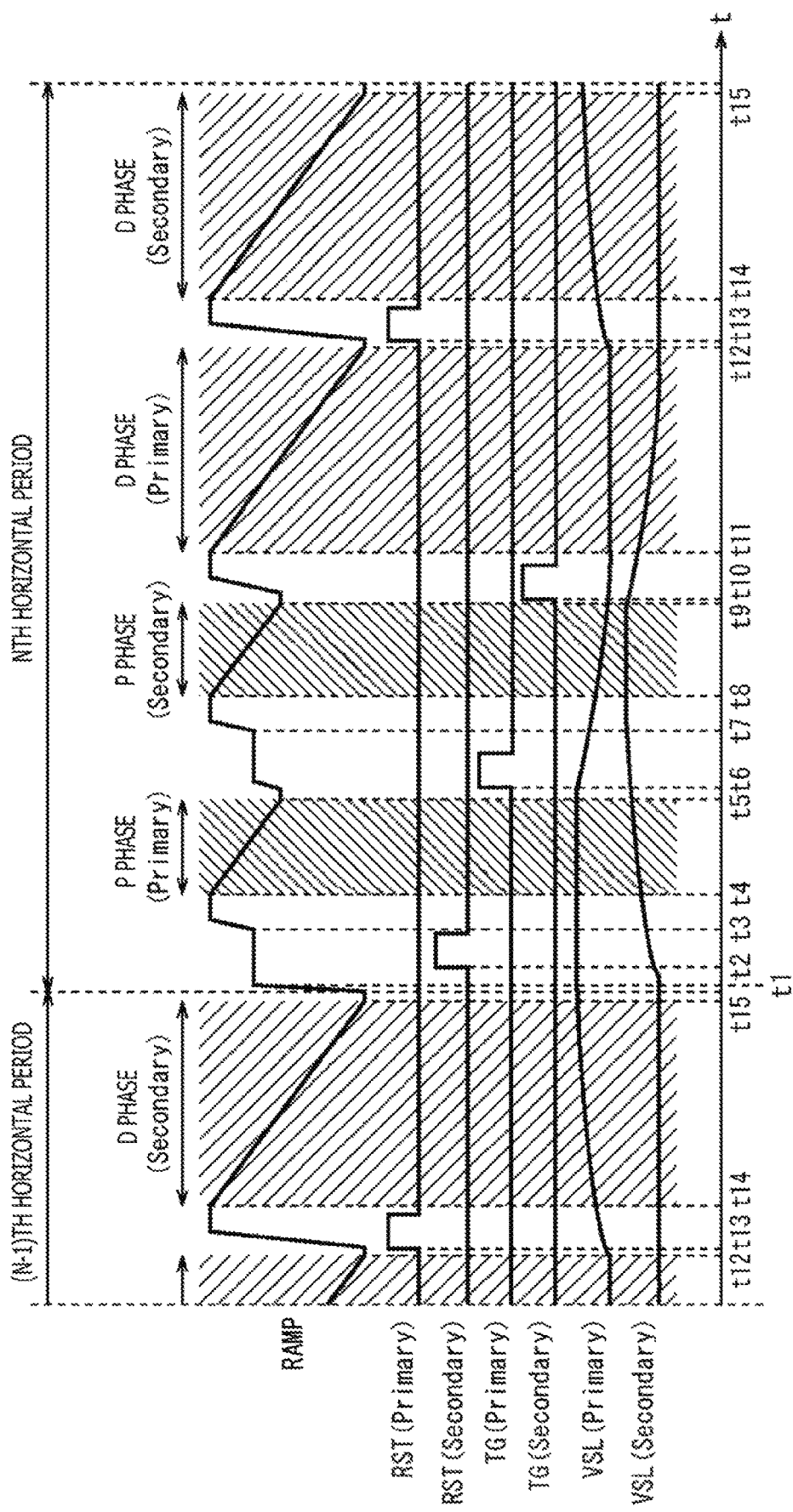
FIG. 4 is a timing chart for describing a first example of a reading method of image signals in one horizontal period.

FIG. 4 is a timing chart illustrating time-series transition of each signal in one horizontal period. A horizontal axis indicates a time axis. FIG. 4 illustrates transition of a ramp signal (RAMP) input from the ramp signal generation circuit 16 to the comparator 84, a reset signal RST and a transfer signal TG input to the pixel 21a, a reset signal RST and a transfer signal TG input to the pixel 21b, a voltage VSL of the first vertical signal line 23a, and a voltage VSL of the second vertical signal line 23b.

Note that in FIG. 4, the pixel 21a is referred to as a first (Primary) pixel, and the pixel 21b is referred to as a second (Secondary) pixel. In addition, the reset signal RST and the transfer signal TG input to the pixel 21a are referred to as RST (Primary) and TG (Primary), and the reset signal RST and the transfer signal TG input to the pixel 21b are referred to as RST (Secondary) and TG (Secondary). Furthermore, the voltage VSL of the first vertical signal line 23a is referred to as VSL (Primary), and the voltage VSL of the second vertical signal line 23b is referred to as VSL (Secondary).

The imaging element 10 can read the pixel signals of the pixel 21a and the pixel 21b of different rows in the same column all at once in one horizontal period.

Specifically, at time t13 of the previous (N−1)th horizontal period, the reset signal RST (Primary) is input to the reset transistor 66a of the pixel 21a, and the FD unit 63a is reset.

Then, at time t1 of an Nth horizontal period, the input switch 82-1 and the feedback switch 85 are turned on.

At time t2, the reset signal RST (Secondary) is input to the reset transistor 66b of the pixel 21b, and the FD unit 63b is reset.

At time t3, the feedback switch 85 is turned off.

At time t4, the ramp signal starts to drop, and in a period from time t4 to time t5, AD conversion of the pixel signal of the pixel 21a in the reset level (P phase (Primary)) input through the first vertical signal line 23a is performed. The input switch 82-1 is then turned off. The digital value of the pixel signal of the pixel 21a in the reset level is held in the counter 72.

After time t5, the input switch 82-2 and the feedback switch 85 are turned on.

At time t6, the transfer signal TG (Primary) is input to the transfer transistor 62a of the pixel 21a, and the charge accumulated in the PD 61a is transferred to the FD unit 63a.

At time t7, the feedback switch 85 is turned off.

At time t8, the ramp signal starts to drop, and in a period from time t8 to time t9, AD conversion of the pixel signal of the pixel 21b in the reset level (P phase (Secondary)) input through the second vertical signal line 23b is performed. The input switch 82-2 is then turned off. The digital value of the pixel signal of the pixel 21b in the reset level is held in the counter 72.

After time t9, the input switch 82-1 is turned on.

At time t10, the transfer signal TG (Secondary) is input to the transfer transistor 62b of the pixel 21b, and the charge accumulated in the PD 61b is transferred to the FD unit 63b.

At time t1, the ramp signal starts to drop, and in a period from time t11 to time t12, AD conversion of the pixel signal of the pixel 21a in the signal level (D phase (Primary)) input through the first vertical signal line 23a is performed. The input switch 82-1 is then turned off. Furthermore, the output switch 73 is turned on, and the digital pixel signal that is the difference between the pixel signal of the pixel 21a in the signal level and the pixel signal in the reset level is output from the counter 72 to the output signal line 24.

After time t12, the input switch 82-2 is turned on.

At time t14, the ramp signal starts to drop, and in a period from time t14 to time t15, AD conversion of the pixel signal of the pixel 21b in the signal level (D phase (Secondary)) input through the second vertical signal line 23b is performed. The input switch 82-2 is then turned off. Furthermore, the output switch 73 is turned on, and the digital pixel signal that is the difference between the pixel signal of the pixel 21b in the signal level and the pixel signal in the reset level is output from the counter 72 to the output signal line 24.

In this way, each column processing unit 51 of the column signal processing circuit 13 can execute the pipeline processing to read the pixel signals of the pixels 21 of two different rows all at once in one horizontal period while executing the CDS processing.

{Exposure Period}

Next, an example of an exposure period of the imaging element 10 will be described with reference to FIG. 5.

Figure 5:
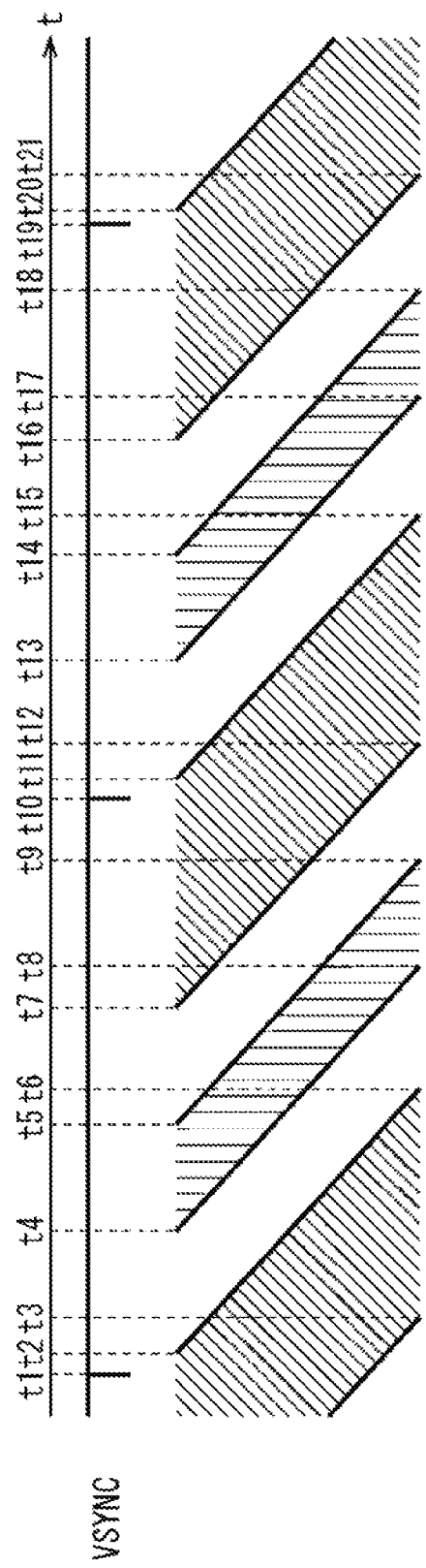
FIG. 5 is a timing chart illustrating an example of an exposure period of the imaging element.

FIG. 5 is a timing chart illustrating an exposure period of the valid area AE of the pixel area 11 of the imaging element 10. The horizontal axis indicates the time axis.

In the imaging element 10, exposure is performed twice with different time periods, that is, long-time exposure and short-time exposure, in one vertical period in each pixel 21.

Then, for example, a pixel signal based on the charge accumulated in the long-time exposure (hereinafter, referred to as long-accumulation signal) and a pixel signal based on the charge accumulated in the short-time exposure (hereinafter, referred to as short-accumulation signal) can be selected according to the amount of incident light, or a weighted sum of the signals can be calculated to expand the dynamic range of the obtained image.

Specifically, a vertical synchronization signal VSYNC is input to the control circuit 17 from the outside at time t1. As a result, a new vertical period is started.

At time t2, the long-time exposure of the first row of the valid area AE is finished, and the pixel signals based on the charge accumulated during the exposure are read. Subsequently, the long-time exposure of the rows of the valid area AE in a forward direction is sequentially finished at predetermined time intervals, and the long-accumulation signals based on the charge accumulated during the exposure are read. The long-time exposure of the last row of the valid area AE is then finished at time t6, and the long-accumulation signals based on the charge accumulated during the exposure are read. In this way, a read scan of the long-accumulation signals is performed in a period from time t2 to time t6.

Here, the forward direction is a direction from top to bottom of the pixel area 11. Conversely, a direction from bottom to top of the pixel area 11 will be referred to as a reverse direction.

At time t3, the long-time exposure of the pixels 21 of the last row of the valid area AE is started.

At time t4, the short-time exposure of the pixels 21 of the first row of the valid area AE is started. Subsequently, the short-time exposure of the pixels 21 of the valid area AE in the forward direction is sequentially started at predetermined time intervals. The short-time exposure of the pixels 21 of the last row of the valid area AE is then started at time t8.

At time t5, the short-time exposure of the first row of the valid area AE is finished, and the pixel signals based on the charge accumulated during the exposure are read. Subsequently, the short-time exposure of the rows of the valid area AE in the forward direction is sequentially finished at predetermined time intervals, and the short-accumulation signals based on the charge accumulated during the exposure are read. The long-time exposure of the last row of the valid area AE is then finished at time t9, and the short-accumulation signals based on the charge accumulated during the exposure are read. In this way, a read scan of the short-accumulation signals is performed in a period from time t5 to time t9.

Here, the read scan of the long-accumulation signals and the read scan of the short-accumulation signals are performed in parallel in a period from time t5 to time t6. More specifically, according to the method described with reference to FIG. 3, the long-accumulation signal of a row in each column of the valid area AE is read, and the short-accumulation signal of another row of the valid area AE is read in one horizontal period.

At time t7, the long-time exposure of the first row of the valid area AE is started. Subsequently, the long-time exposure of the rows of the valid area AE in the forward direction is sequentially started at predetermined time intervals. The long-time exposure of the last row of the valid area AE is then started at time t12.

At time t10, a vertical synchronization signal VSYNC is input to the control circuit 17 from the outside. As a result, a new vertical period is started.

Subsequently, a process similar to the process in the period from time t1 to time t10 described above is repeatedly executed.

In this way, the imaging element 10 performs the exposure twice, that is, long-time exposure and short-time exposure, in one vertical period in each pixel 21 and reads two types of pixel signals, that is, long-accumulation signals based on long-time exposure and short-accumulation signals based on short-time exposure.

2. Cause of Generation of Noise

Next, possible noise and a cause of generation of the noise in the imaging element 10 will be described with reference to FIGS. 6 to 8.

Figure 6:
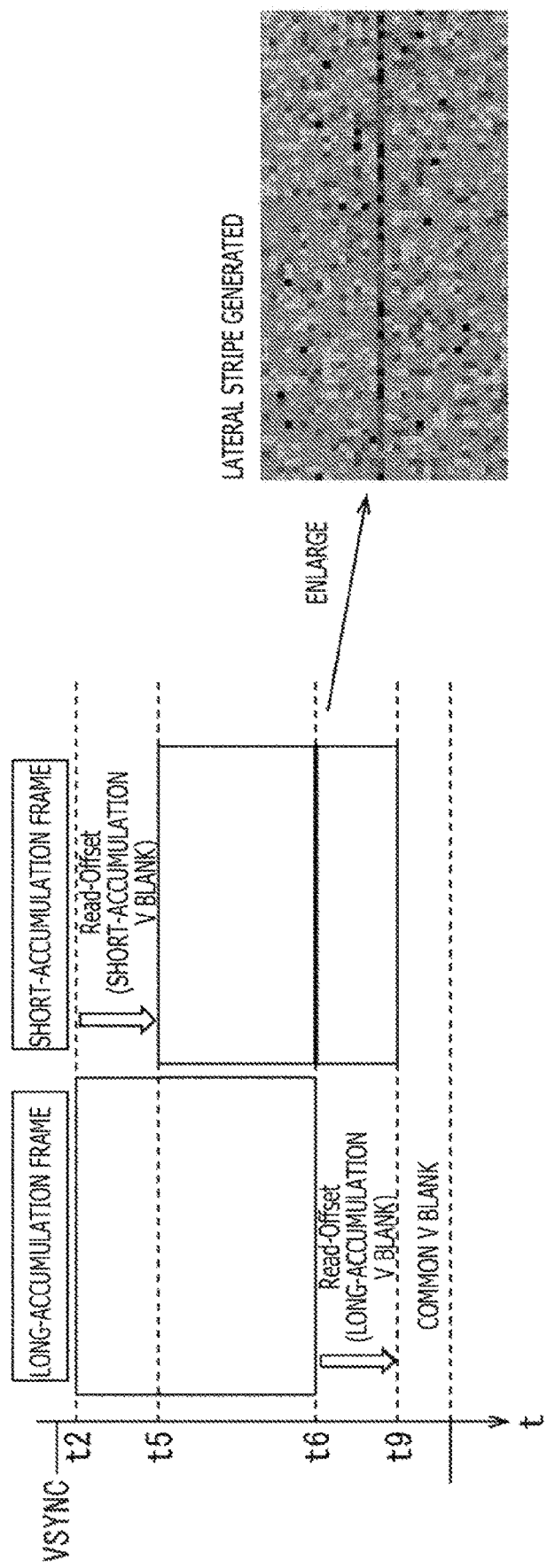
FIG. 6 is a diagram for describing a cause of generation of noise in an image.

A diagram on the left of FIG. 6 depicts comparison of read periods of an image obtained from the long-accumulation signals (hereinafter, referred to as long-accumulation frame) and an image obtained from short-accumulation signals (hereinafter, referred to as short-accumulation frame). The vertical axis indicates the time axis. Note that each time indicated on the time axis corresponds to each time of the time axis in the timing chart of FIG. 5.

As described above, the read scan of the long-accumulation signals of the long-accumulation frame is started at time t2 and finished at time t6. On the other hand, the read scan of the short-accumulation signals of the short-accumulation frame is started at time t5 and finished at time t9. Only the read scan of the long-accumulation signals is performed in the period from time t2 to time t5, and the read scan of the short-accumulation signals is not performed in the period (hereinafter, referred to as short-accumulation V blank period). Only the read scan of the short-accumulation signals is performed in the period from time t6 to time t9, and the read scan of the long-accumulation signals is not performed in the period (hereinafter, referred to as long-accumulation V blank period). The period from time t9 to time t11, at which the next read scan of the long-accumulation signals is started (FIG. 5), is a period in which the read scan of the long-accumulation signals and the short-accumulation signals is not performed (hereinafter, referred to as common V blank period).

Note that strictly speaking, the read period of the black level signals of the OPB area AB is not included in the V blank period as described later, but the period other than the read periods of the pixel signals of the valid area AE is referred to as the V blank period here to simplify the description.

Here, as illustrated in a diagram on the right of FIG. 6, a lateral stripe may be generated in a row of the short-accumulation frame corresponding to the short-accumulation signals read just after the end of the read scan of the long-accumulation signals at time t6. The cause of the lateral stripe will be described with reference to FIG. 7.

Figure 7:
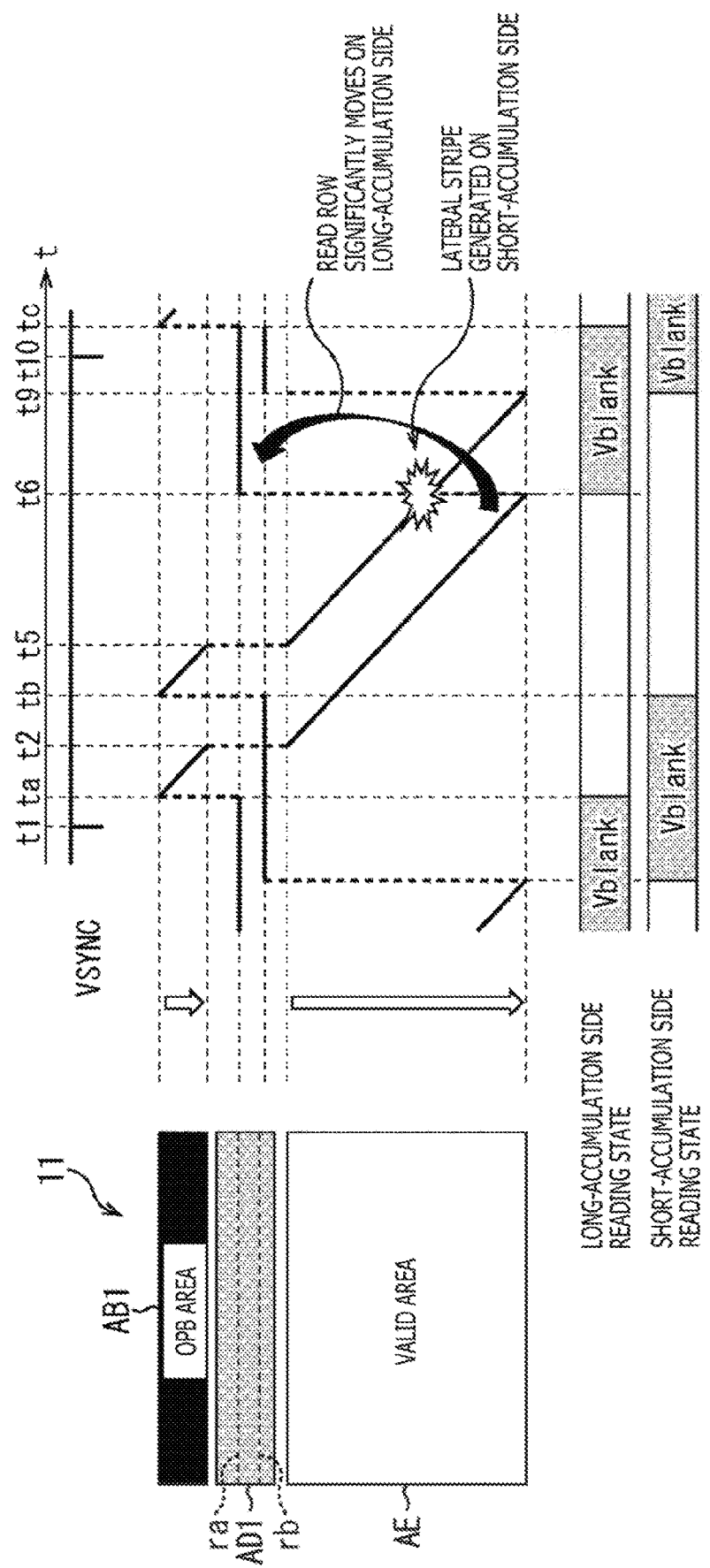
FIG. 7 is a diagram for describing the cause of generation of noise in the image.

A diagram on the left side of FIG. 7 schematically illustrates an arrangement example of the pixel area 11 of the imaging element 10. In the example, an OPB area AB1, a dummy area AD1, and the valid area AE are arranged from the top. Note that in the diagram, the usable area AU, the valid pixel area AEp, the validity unquestioned area AEn, the OPB detection area ABd, the OPB unquestioned area ABn, and the invalid area AN are not illustrated to facilitate the understanding of the diagram. Furthermore, the usable area AU and the valid area AE coincide in the illustrated example.

A diagram on the right side of FIG. 7 is a timing chart illustrating the read scan of the long-accumulation signals and the read scan of the short-accumulation signals in more detail than in FIG. 5. Note that each time indicated on the time axis corresponds to each time of the time axis in the timing chart of FIGS. 5 and 6.

Note that the read scan of the long-accumulation signals will also be referred to as read scan on the long-accumulation side or simply referred to as long-accumulation side, and the read scan of the short-accumulation signals will also be referred to as read scan on the short-accumulation side or simply referred to as short-accumulation side.

First, the read scan on the long-accumulation side will be described.

At time t1, the pixel signals (hereinafter referred to as dummy signals) of a row ra of the dummy area AD1 are read on the long-accumulation side when the vertical synchronization signal VSYNC is input.

Next, at time ta, the V blank period ends, and the read scan of the black level signals is started from the top row of the OPB area AB1. Subsequently, the read scan of the black level signals of the OPB area AB1 in the forward direction is sequentially performed at predetermined time intervals. Then, after the black level signals of the last row of the OPB area AB1 are read, and the read scan of the black level signals of the OPB area AB1 is finished, the read scan of the long-accumulation signals of the valid area AE in the forward direction is sequentially performed from time t2 to time t6 as described above.

At time t6, after the long-accumulation signals of the last row of the valid area AE are read, and the read scan of the long-accumulation signals of the valid area AE is finished, the reading of the dummy signals of the row ra of the dummy area AD1 is started, and the V blank period is started.

In this case, the amount of movement of the read row on the long-accumulation side exceeds the width of the valid area AE in the column direction, and the amount of movement becomes significantly large. Subsequently, the reading of the dummy signals is continued until time tc at which the read scan of the black level signals of the next frame is started.

Next, the read scan on the short-accumulation side will be described.

At time t1, the dummy signals of a row rb of the dummy area AD1 are read on the short-accumulation side when the vertical synchronization signal VSYNC is input.

At time tb, the V blank period ends, and the read scan of the black level signals is started from the top row of the OPB area AB1. Subsequently, the read scan of the black level signals of the OPB area AB1 in the forward direction is sequentially performed at predetermined time intervals. Then, after the black level signals of the last row of the OPB area AB1 are read, and the read scan of the black level signals of the OPB area AB1 is finished, the read scan of the short-accumulation signals of the valid area A in the forward direction is sequentially performed from time t5 to time t9 as described above.

At time t9, after the short-accumulation signals of the last row of the valid area AE are read, and the read scan of the short-accumulation signals of the valid area AE is finished, the reading of the dummy signals of the row rb of the dummy area AD1 is started, and the V blank period is started.

In this case, the amount of movement of the read row on the short-accumulation side exceeds the width of the valid area AE in the column direction, and the amount of movement becomes significantly large. Subsequently, the reading of the dummy signals is continued until time td (not illustrated) at which the read scan of the black level signals of the next frame is started.

Figure 8:
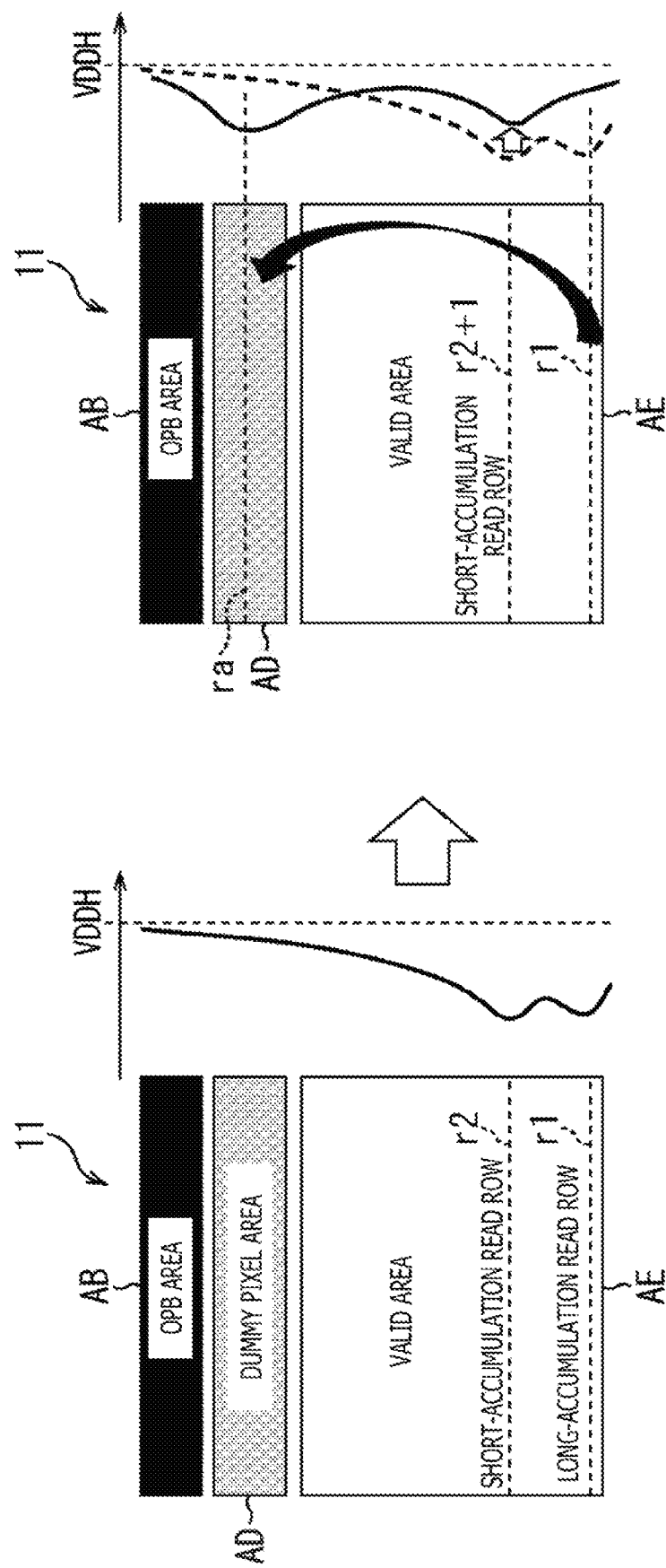
FIG. 8 is a diagram for describing the cause of generation of noise in the image.

FIG. 8 illustrates an example of a distribution of the voltage of the pixel power source VDD in the column direction in the pixel area 11. A diagram on the left side of FIG. 8 illustrates a distribution of the voltage of the pixel power source VDD in the reading of the long-accumulation signals in the reset level in a last row r1 of the valid area AE and the short-accumulation signals in the reset level in a row r2 at time t6. A diagram on the right side of FIG. 8 illustrates a distribution of the voltage of the pixel power source VDD in the reading of the dummy signals in the reset level in the row ra of the dummy area AD1 and the short-accumulation signals in the reset level in a row r2+1 at time t6+Δt just after time t6.

The horizontal axis of left and right graphs in FIG. 8 indicates the voltage of the image power source VDD. In addition, the voltage indicated by a dotted line indicates a level of a voltage VDDH that is the voltage of the pixel power source VDD in the case without occurrence of a voltage drop.

At time t6, a large amount of current flows in the pixels of the row r1 and the row r2 in which the pixel signals are read. Therefore, the voltage drop (IR drop) of the pixel power source VDD becomes large in the row r1 and the row r2 as illustrated in the graph on the left side of FIG. 8. As a result, negative peaks are generated in the voltage of the pixel power source VDD in the row r1 and the row r2. The voltage increases with an increase in the distance from the row r1 and the row r2, and the voltage approaches the voltage VDDH.

Similarly, at time t6+Δt, a large amount of current flows in the pixels of the row ra and the row r2+1 in which the pixel signals are read. Therefore, the voltage drop (IR drop) of the pixel power source VDD becomes large in the row ra and the row r2+1 as illustrated in the graph on the right side of FIG. 8.

Here, at time t6+Δt, while the read row on the short-accumulation side moves only by one row from time t6, the read row on the long-accumulation side significantly moves. Therefore, the distribution of the voltage of the pixel power source VDD significantly changes. Specifically, at time t6+Δt, the interval between the read row on the long-accumulation side and the read row on the short-accumulation side is wider than at time t6, and the voltage drop of the row r2+1 becomes smaller than the voltage drop of the row r2 at time t6. Therefore, the voltage of the pixel power source VDD in the row r2+1 at time t6+Δt becomes higher than the voltage of the pixel power source VDD in the row r2 at time t6. As a result, there is a difference between the reset level of the short-accumulation signals of the row r2 and the reset level of the short-accumulation signals of the row r2+1, and the lateral stripe is generated in the short-accumulation frame as described with reference to FIG. 7.

Note that hereinafter, a movement of the read row by equal to or greater than a predetermined amount of movement that causes fluctuation of the voltage of the pixel power source VDD at a level that generates the lateral stripe as illustrated in FIG. 7 will be referred to as address jump. Note that the predetermined amount of movement may be, for example, defined by the number of rows or may be defined by the actual distance.

3. First Embodiment

Next, a first embodiment of the present technique will be described with reference to FIG. 9.

Figure 9:
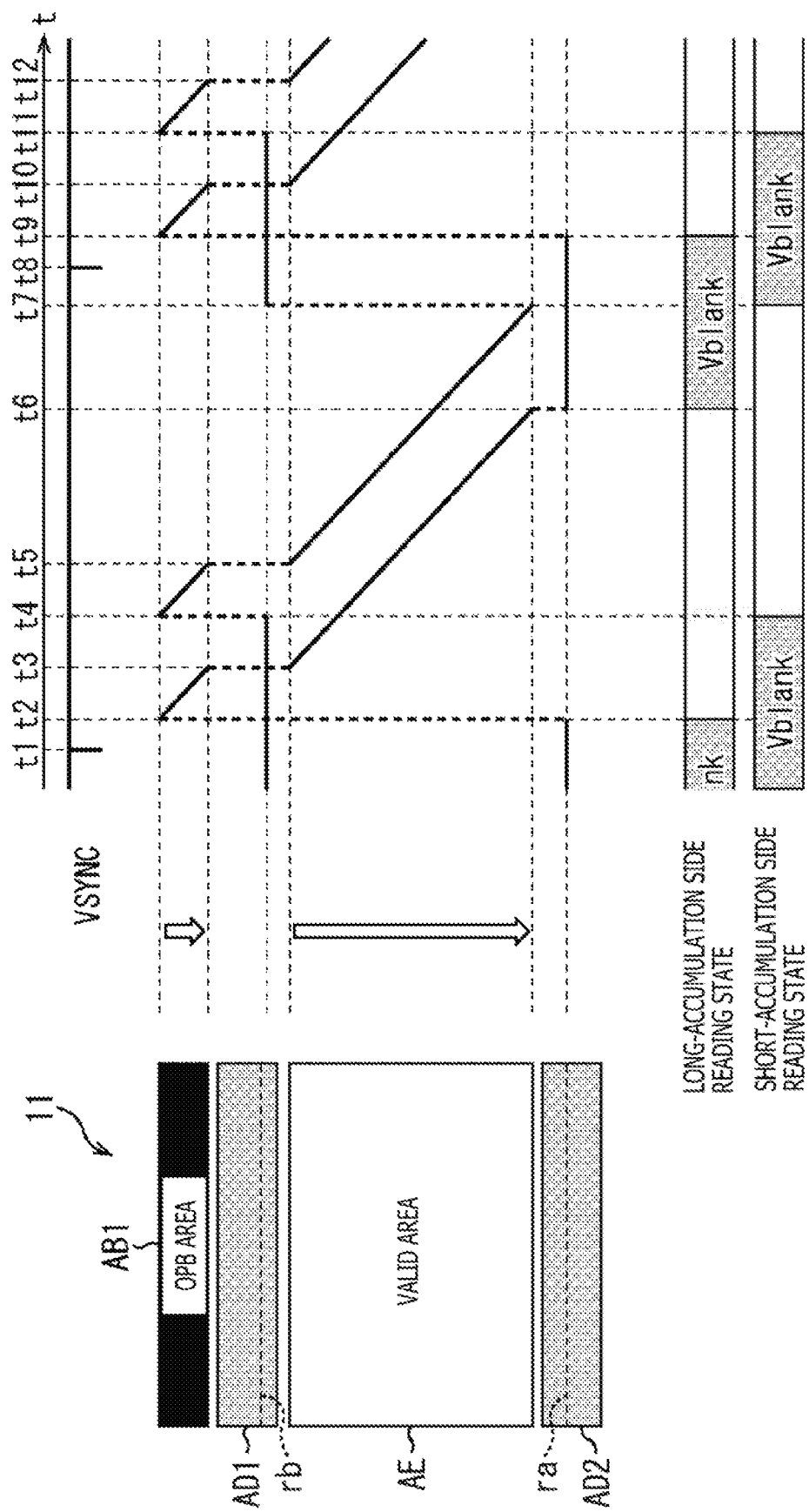
FIG. 9 is a diagram for describing a first embodiment of the present technique.

A diagram on the left side of FIG. 9 schematically illustrates an arrangement example of the pixel area 11 of the imaging element 10 as in the diagram on the left side of FIG. 7. The arrangement example of FIG. 9 is different from the arrangement example of FIG. 7 in that a dummy area AD2 is arranged below the valid area AE. Therefore, the dummy area AD1 and the dummy area AD2 are arranged on the sides of the valid area AE (valid pixel area AEp) in the column direction (up and down direction) in the example.

A diagram on the right side of FIG. 9 illustrates a timing chart of read scans on the long-accumulation side and the short-accumulation side as in the diagram on the right side of FIG. 7.

At time t1, the vertical synchronization signal VSYNC is input to the control circuit 17, and a new vertical period is started. In this case, the dummy signals of the row ra in the dummy area AD2 are read on the long-accumulation side, and the dummy signals of the row rb in the dummy area AD1 are read on the short-accumulation side.

At time t2, the V blank period ends on the long-accumulation side, and the read scan of the black level signals is started from the top row of the OPB area AB1.

In this case, the address jump occurs on the long-accumulation side, and the voltage of the pixel power source VDD significantly fluctuates in the dummy row rb that is the read row on the short-accumulation side. However, the dummy signals read from the dummy row rb are not used for the image, and the image quality is not affected.

Subsequently, the read scan of the black level signals of the OPB area AB1 in the forward direction is sequentially performed at predetermined time intervals on the long-accumulation side. Then, after the black level signals of the last row of the OPB area AB1 are read, and the read scan of the black level signals of the OPB area AB1 is finished, the read scan of the long-accumulation signals is started from the top row of the valid area AE at time t3. Subsequently, the read scan of the long-accumulation signals of the valid area AE in the forward direction is sequentially performed at predetermined time intervals.

At time t4, the V blank period ends on the short-accumulation side, and the read scan of the black level signals is started from the top row of the OPB area AB1.

Subsequently, the read scan of the black level signals of the OPB area AB1 in the forward direction is sequentially performed at predetermined time intervals on the short-accumulation side. Then, after the black level signals of the last row of the OPB area AB1 are read, and the read scan of the black level signals of the OPB area AB1 is finished, the read scan of the short-accumulation signals is started from the top row of the valid area AE at time t5. Subsequently, the read scan of the short-accumulation signals of the valid area AE in the forward direction is sequentially performed at predetermined time intervals.

At time t6, the long-accumulation signals of the last row of the valid area AE are read, and the read scan of the long-accumulation signals of the valid area AE is finished. Subsequently, the reading of the dummy signals of the row ra of the dummy area AD2 is started on the long-accumulation side, and the V blank period is started.

In this case, the read row on the long-accumulation side is moved to the dummy area AD2 instead of the dummy area AD1, and this prevents the occurrence of the address jump on the long-accumulation side during the reading of the short-accumulation signals.

At time t7, the short-accumulation signals of the last row of the valid area AE are read, and the read scan of the short-accumulation signals of the valid area AE is finished.

Subsequently, the reading of the dummy signals of the row ra of the dummy area AD2 is started on the short-accumulation side, and the V blank period is started.

In this case, the address jump occurs on the short-accumulation side, and the voltage of the pixel power source VDD significantly fluctuates in the dummy row ra that is the read row on the long-accumulation side. However, the dummy signals read from the dummy row ra are not used for the image, and the image quality is not affected.

Next, at time t8, the vertical synchronization signal VSYNC is input to the control circuit 17, and a new vertical period is started. Subsequently, a process similar to the process from time t1 to time t8 is repeatedly executed.

In this way, the movement of the read row on the long-accumulation side and the short-accumulation side is controlled such that the address jump is performed on one side when the dummy signals are read on the other side, and the address jump is not performed on one side when the pixel signals in the valid area AE or the OPB area AB1 are read on the other side. This can prevent the degradation of the image quality caused by the voltage fluctuation of the pixel power source VDD associated with the address jump.

4. Second Embodiment

Next, a second embodiment of the present technique will be described with reference to FIG. 10.

Figure 10:
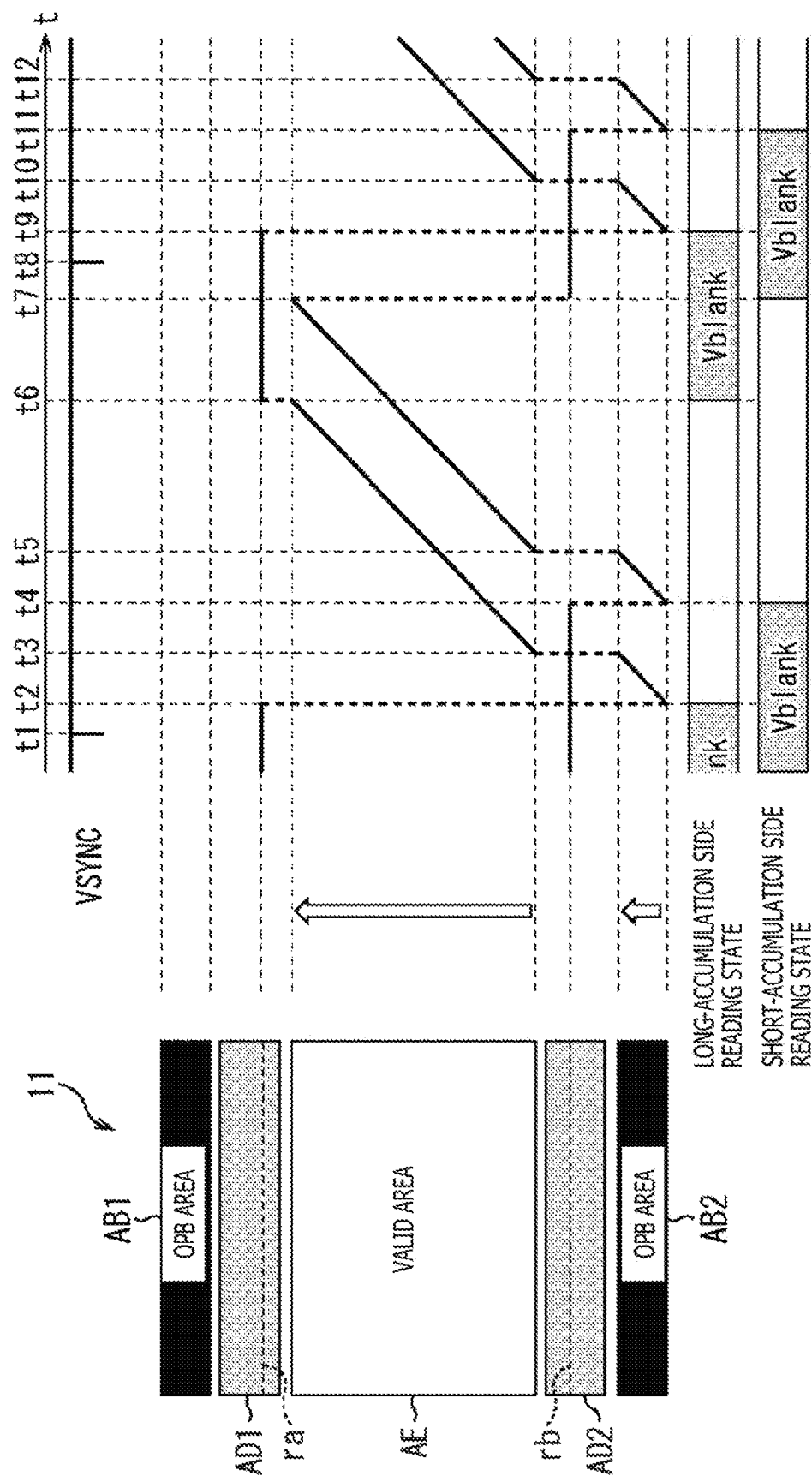
FIG. 10 is a diagram for describing a second embodiment of the present technique.

A diagram on the left side of FIG. 10 schematically illustrates an arrangement example of the pixel area 11 of the imaging element 10 as in the diagram on the left side of FIG. 9. The arrangement example of FIG. 10 is different from the arrangement example of FIG. 9 in that an OPB area AB2 is arranged below the dummy area AD2. Therefore, the OPB area AB1 and the OPB area AB2 are arranged on the sides of the valid area AE (valid pixel area AEp) in the column direction (up and down direction) in the example.

A diagram on the right side of FIG. 10 illustrates a timing chart of the read scans on the long-accumulation side and the short-accumulation side as in the diagram on the right side of FIG. 9.

At time t1, the vertical synchronization signal VSYNC is input to the control circuit 17, and a new vertical period is started. In this case, the dummy signals of the row ra in the dummy area AD1 are read on the long-accumulation side, and the dummy signals of the row rb in the dummy area AD2 are read on the short-accumulation side.

At time t2, the V blank period ends on the long-accumulation side, and the read scan of the black level signals is started from the last row of the OPB area AB2.

In this case, although the address jump occurs on the long-accumulation side, the dummy signals are read on the short-accumulation side, and the image quality is not affected.

Subsequently, the read scan of the black level signals of the OPB area AB2 in the reverse direction is sequentially performed at predetermined time intervals on the long-accumulation side. Then, after the black level signals of the top row of the OPB area AB2 are read, and the read scan of the black level signals of the OPB area AB2 is finished, the read scan of the long-accumulation signals is started from the last row of the valid area AE at time t3. Subsequently, the read scan of the long-accumulation signals of the valid area AE in the reverse direction is sequentially performed at predetermined time intervals.

At time t4, the V blank period ends on the short-accumulation side, and the read scan of the black level signals is started from the last row of the OPB area AB2.

In this case, the read row on the short-accumulation side is moved to the OPB area AB2 instead of the OPB area AB1, and this prevents the occurrence of the address jump on the short-accumulation side during the reading of the long-accumulation signals.

Subsequently, the read scan of the black level signals of the OPB area AB2 in the reverse direction is sequentially performed at predetermined time intervals on the short-accumulation side. Then, after the black level signals of the top row of the OPB area AB2 are read, and the read scan of the black level signals of the OPB area AB2 is finished, the read scan of the short-accumulation signals is started from the last row of the valid area AE at time t5. Subsequently, the read scan of the short-accumulation signals of the valid area AE in the reverse direction is sequentially performed at predetermined time intervals.

At time t6, the long-accumulation signals of the top row of the valid area AE are read, and the read scan of the long-accumulation signals of the valid area AE is finished. Subsequently, the reading of the dummy signals of the row ra of the dummy area AD1 is started on the long-accumulation side, and the V blank period is started.

In this case, the dummy area AD1 is selected as an area for reading the dummy signals on the long-accumulation side instead of the dummy area AD2. Therefore, the amount of movement of the read row on the long-accumulation side is small, and the address jump is not performed. This reduces the fluctuation of the voltage of the pixel power source VDD of the read row on the short-accumulation side and prevents the generation of the lateral stripe in the short-accumulation frame.

At time t7, the short-accumulation signals of the top row of the valid area AE are read, and the read scan of the short-accumulation signals of the valid area AE is finished. Subsequently, the reading of the dummy signals of the row rb of the dummy area AD2 is started on the short-accumulation side, and the V blank period is started.

In this case, although the address jump occurs on the short-accumulation side, the dummy signals are read on the long-accumulation side, and the image quality is not affected.

Next, at time t8, the vertical synchronization signal VSYNC is input to the control circuit 17, and a new vertical period is started. Subsequently, a process similar to the process from time t1 to time t8 is repeatedly executed.

In this way, the movement of the read row on the long-accumulation side and the short-accumulation side is controlled such that the address jump is performed on one side when the dummy signals are read on the other side, and the address jump is not performed on one side when the pixel signals in the valid area AE or in one of the OPB area AB1 and the OPB area AB2 are read on the other side. This can also prevent the degradation of the image quality caused by the voltage fluctuation of the pixel power source VDD associated with the address jump in the case of reading the pixel signals in the reverse direction.

Note that in the arrangement example of the pixel area 11 of FIG. 10, the read scans on the long-accumulation side and the short-accumulation side can also be performed in the forward direction as described with reference to FIG. 9 to prevent the degradation of the image quality caused by the voltage fluctuation of the pixel power source VDD.

5. Third Embodiment

Next, a third embodiment of the present technique will be described with reference to FIG. 11.

Figure 11:
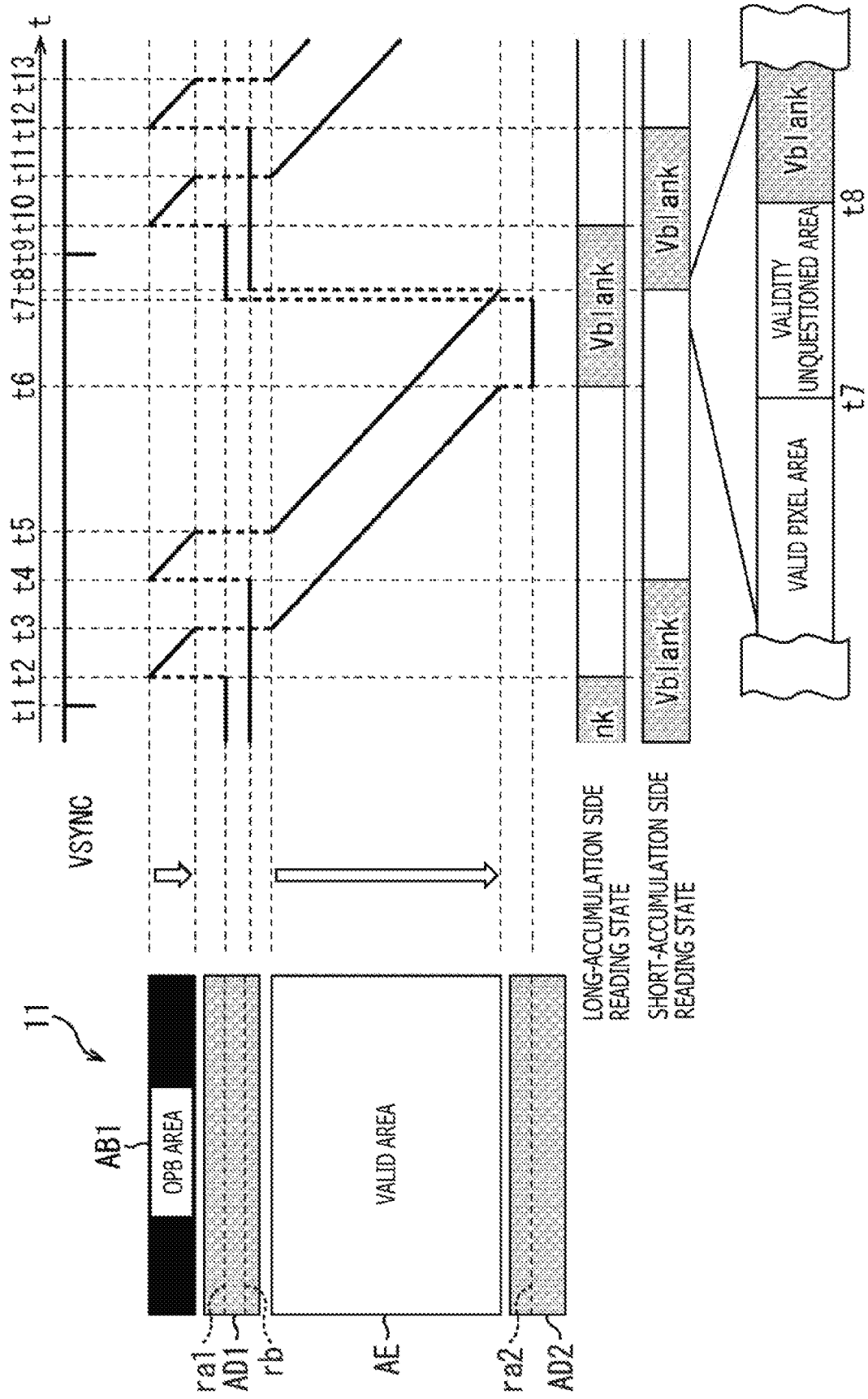
FIG. 11 is a diagram for describing a third embodiment of the present technique.

A diagram on the left side of FIG. 11 schematically illustrates an arrangement example of the pixel area 11 of the imaging element 10 as in the diagram on the left side of FIG. 9. The arrangement example of FIG. 11 is the same as the arrangement example of FIG. 9.

A diagram on the right side of FIG. 11 illustrates a timing chart of read scans on the long-accumulation side and the short-accumulation side as in the diagram on the right side of FIG. 9.

At time t1, the vertical synchronization signal VSYNC is input to the control circuit 17, and a new vertical period is started. In this case, the dummy signals of a row ra1 in the dummy area AD1 are read on the long-accumulation side, and the dummy signals of the row rb in the dummy area AD1 are read on the short-accumulation side.

At time t2, the V blank period ends on the long-accumulation side, and the read scan of the black level signals is started from the top row of the OPB area AB1.

Subsequently, the read scan of the black level signals of the OPB area AB1 in the forward direction is sequentially performed at predetermined time intervals on the long-accumulation side. Then, after the black level signals of the last row of the OPB area AB1 are read, and the read scan of the black level signals of the OPB area AB1 is finished, the read scan of the long-accumulation signals is started from the top row of the valid area AE at time t3. Subsequently, the read scan of the long-accumulation signals of the valid area AE in the forward direction is sequentially performed at predetermined time intervals.

At time t4, the V blank period ends on the short-accumulation side, and the read scan of the black level signals is started from the top row of the OPB area AB1.

Subsequently, the read scan of the black level signals of the OPB area AB1 in the forward direction is sequentially performed at predetermined time intervals on the short-accumulation side. Then, after the black level signals of the last row of the OPB area AB1 are read, and the read scan of the black level signals of the OPB area AB1 is finished, the read scan of the short-accumulation signals is started from the top row of the valid area AE at time t5. Subsequently, the read scan of the short-accumulation signals of the valid area AE in the forward direction is sequentially performed at predetermined time intervals.

At time t6, the long-accumulation signals of the last row of the valid area AE are read, and the read scan of the long-accumulation signals of the valid area AE is finished. Subsequently, the reading of the dummy signals of a row ra2 of the dummy area AD2 is started on the long-accumulation side, and the V blank period is started.

In this case, the read row on the long-accumulation side is moved to the dummy area AD2 instead of the dummy area AD1, and this prevents the occurrence of the address jump on the long-accumulation side during the reading of the short-accumulation signals.

At time t7, the read row of the short-accumulation signals moves into the validity unquestioned area AEn at the lower end of the valid area AE. Then, after the read row of the short-accumulation signals is moved into the validity unquestioned area AEn, the read row on the long-accumulation side moves from the row ra2 in the dummy area AD2 to the row ra1 in the dummy area AD1.

In this case, the address jump occurs on the long-accumulation side, and the voltage of the pixel power source VDD significantly fluctuates in the read row on the short-accumulation side. However, the short-accumulation signals in the validity unquestioned area AEn are read on the short-accumulation side, and the read short-accumulation signals are not used for the image. Therefore, the image quality is not affected.

Next, at time t8, the short-accumulation signals of the last row of the valid area AE are read, and the read scan of the short-accumulation signals of the valid area AE is finished. Subsequently, the reading of the dummy signals of the row rb of the dummy area AD1 is started on the short-accumulation side, and the V blank period is started.

In this case, although the address jump occurs on the short-accumulation side, the dummy signals are read on the long-accumulation side, and the image quality is not affected.

Next, at time t9, the vertical synchronization signal VSYNC is input to the control circuit 17, and a new vertical period is started. Subsequently, a process similar to the process from time t1 to time t9 is repeatedly executed.

In this way, the movement of the read row on the long-accumulation side and the short-accumulation side is controlled such that the address jump is performed on one side when the dummy signals or the pixel signals in the validity unquestioned area AEn are read on the other side, and the address jump is not performed on one side when the pixel signals in the valid pixel area AEp or the OPB area AB1 are read on the other side. This can also prevent the degradation of the image quality caused by the voltage fluctuation of the pixel power source VDD associated with the address jump.

Note that the address jump can be performed on one side not only when the pixel signals in the validity unquestioned area AEn are read, but also when the pixel signals in the OPB unquestioned area ABn are read on the other side.

6. Fourth Embodiment

Next, a fourth embodiment of the present technique will be described with reference to FIG. 12.

Figure 12:
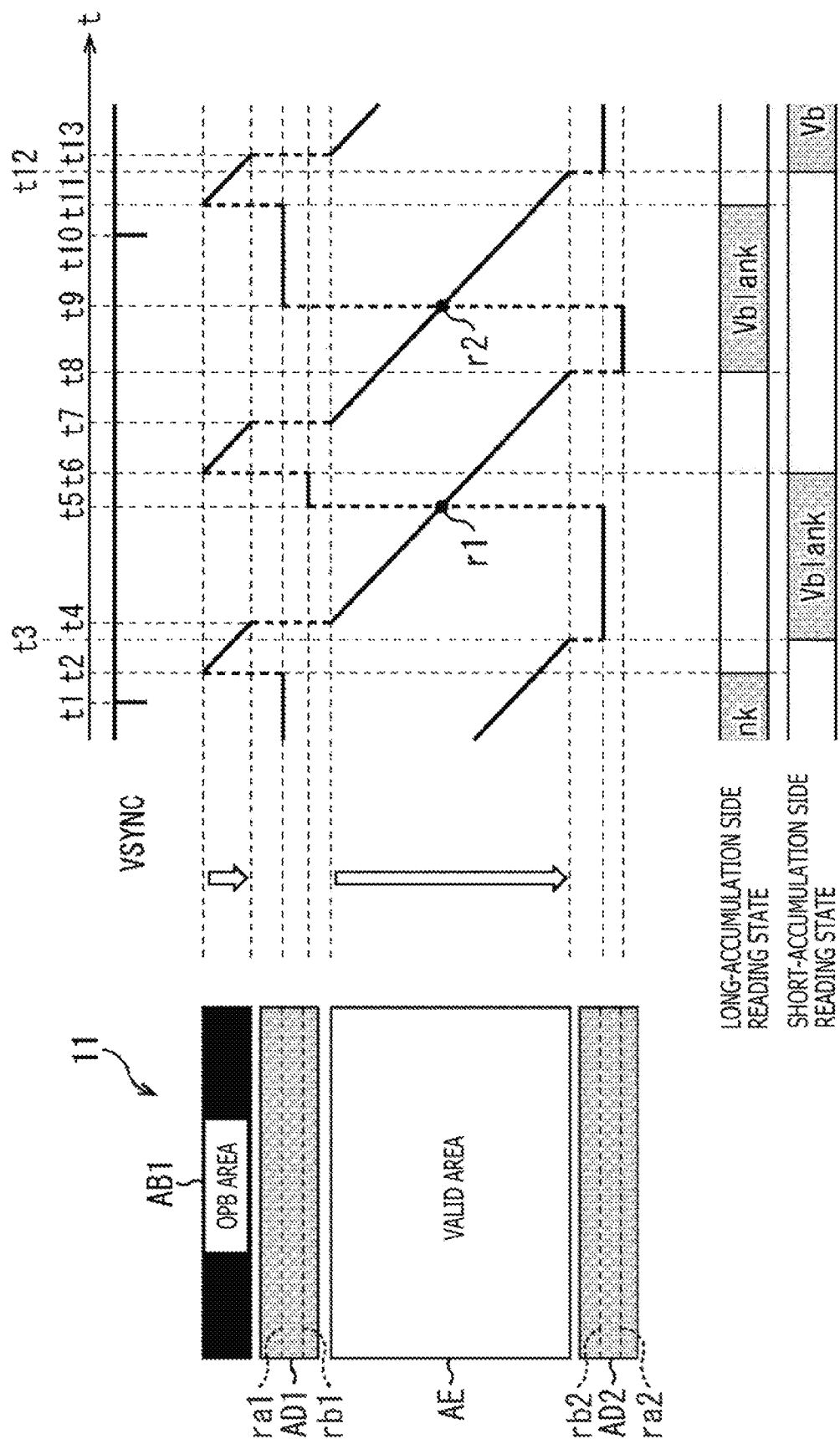
FIG. 12 is a diagram for describing a fourth embodiment of the present technique.

A diagram on the left side of FIG. 12 schematically illustrates an arrangement example of the pixel area 11 of the imaging element 10 as in the diagram on the left side of FIG. 9. The arrangement example of FIG. 12 is the same as the arrangement example of FIG. 9.

A diagram on the right side of FIG. 12 illustrates a timing chart of read scans on the long-accumulation side and the short-accumulation side as in the diagram on the right side of FIG. 9.

At time t1, the vertical synchronization signal VSYNC is input to the control circuit 17, and a new vertical period is started. In this case, the dummy signals of the row ra1 in the dummy area AD1 are read on the long-accumulation side, and the short-accumulation signals of the valid area AE are read on the short-accumulation side.

At time t2, the V blank period ends on the long-accumulation side, and the read scan of the black level signals is started from the top row of the OPB area AB1.

Subsequently, the read scan of the black level signals of the OPB area AB1 in the forward direction is sequentially performed at predetermined time intervals on the long-accumulation side.

At time t3, the short-accumulation signals of the last row of the valid area AE are read, and the read scan of the short-accumulation signals of the valid area AE is finished. Subsequently, the reading of the dummy signals of a row rb2 of the dummy area AD2 is started on the short-accumulation side, and the V blank period is started.

In this case, the read row on the short-accumulation side is moved to the dummy area AD2 instead of the dummy area AD1, and this prevents the occurrence of the address jump on the short-accumulation side during the reading of the black level signals on the long-accumulation side.

Next, after the black level signals of the last row of the OPB area AB1 are read on the long-accumulation side, and the read scan of the black level signals of the OPB area AB1 is finished, the read scan of the long-accumulation signals is started from the top row of the valid area AE at time t4. Subsequently, the read scan of the long-accumulation signals of the valid area AE in the forward direction is sequentially performed at predetermined time intervals.

At time t5, the read row on the short-accumulation side moves from the row rb2 in the dummy area AD2 to a row rb1 in the dummy area AD1.

In this case, the address jump occurs on the short-accumulation side. On other hand, the long-accumulation signals of the row r1 are read substantially at the center of the valid area AE on the long-accumulation side. Then, the distance between the row rb2 and the row r1 that are the read rows on the short-accumulation side before the movement and the distance between the row rb1 and the row r1 that are the read rows on the short-accumulation side after the movement become substantially equal. As a result, the voltage of the pixel power source VDD in the read row on the long-accumulation side hardly fluctuates as described later with reference to FIG. 13.

At time t6, the V blank period ends on the short-accumulation side, and the read scan of the black level signals is started from the top row of the OPB area AB1.

Subsequently, the read scan of the black level signals of the OPB area AB1 in the forward direction is sequentially performed at predetermined time intervals on the short-accumulation side. Then, after the black level signals of the last row of the OPB area AB1 are read, and the read scan of the black level signals of the OPB area AB1 is finished, the read scan of the short-accumulation signals is started from the top row of the valid area AE at time t7. Subsequently, the read scan of the short-accumulation signals of the valid area AE in the forward direction is sequentially performed at predetermined time intervals.

At time t8, the long-accumulation signals of the last row of the valid area AE are read, and the read scan of the long-accumulation signals of the valid area AE is finished. Subsequently, the reading of the dummy signals of the row ra2 of the dummy area AD2 is started on the long-accumulation side, and the V blank period is started.

In this case, the read row on the long-accumulation side is moved to the dummy area AD2 instead of the dummy area AD1, and this prevents the occurrence of the address jump on the long-accumulation side during the reading of the short-accumulation signals.

At time t9, the read row on the long-accumulation side moves from the row ra2 in the dummy area AD2 to the row ra1 in the dummy area AD1.

In this case, the address jump occurs on the long-accumulation side. On the other hand, the short-accumulation signals of the row r2 substantially at the center of the valid area AE are read on the short-accumulation side. Then, the distance between the row ra2 and the row r2 that are the read rows on the long-accumulation side before the movement and the distance between the ra1 and the row r1 that are the read rows on the long-accumulation side after the movement become substantially equal. As a result, the voltage of the pixel power source VDD in the read row on the short-accumulation side hardly fluctuates as described later with reference to FIG. 13.

Next, at time t10, the vertical synchronization signal VSYNC is input to the control circuit 17, and a new vertical period is started. Subsequently, a process similar to the process from time t1 to time t10 is repeatedly executed.

Here, the reason that the voltage of the pixel power source VDD in the read row on the other side hardly fluctuates even if the address jump occurs on one of the long-accumulation side and the short-accumulation side at time t5 and time t9 will be described with reference to FIG. 13.

Figure 13:
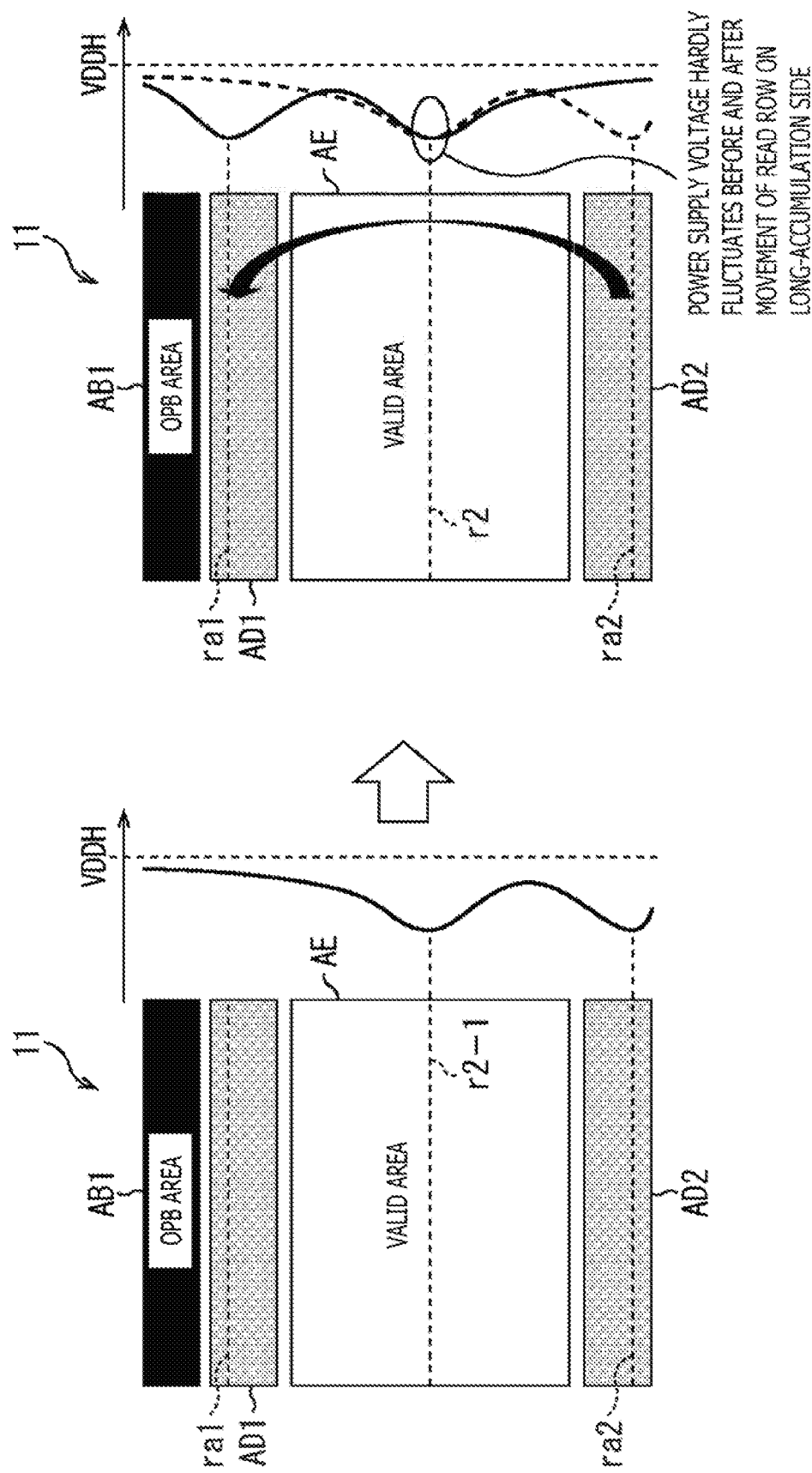
FIG. 13 depicts an example of voltage fluctuation of a pixel power source associated with movement of a read row.

FIG. 13 is a diagram similar to FIG. 8, and FIG. 13 illustrates an example of the distribution of the voltage of the pixel power source VDD in the column direction in the pixel area 11. The left side of FIG. 13 illustrates an example of the distribution of the voltage of the pixel power source VDD in the column direction in the pixel area 11 before the movement of the read row on the long-accumulation side just before time t9 in FIG. 12. The right side of FIG. 13 illustrates an example of the distribution of the voltage of the pixel power source VDD in the column direction in the pixel area 11b after the movement of the read row on the long-accumulation side at time t9 in FIG. 12.

As illustrated in the graph on the left side of FIG. 13, a large amount of current flows just before time t9 in the pixels 21 of a row r2-1 and the row ra2 in which the pixel signals are read. Therefore, the voltage drop (IR drop) of the pixel power source VDD becomes large in the row r2-1 and the row ra2. As a result, negative peaks are generated in the voltage of the pixel power source VDD in the row r2-1 and the row ra2. The voltage increases with an increase in the distance from the row r2-1 and the row ra2, and the voltage approaches the voltage VDDH.

On the other hand, as illustrated in the graph on the right side of FIG. 13, a large amount of current flows at time t9 in the pixels 21 of the row ra1 and the row r2 in which the pixel signals are read. Therefore, the voltage drop (IR drop) of the pixel power source VDD becomes large in the row ra1 and the row r2. As a result, negative peaks are generated in the voltage of the pixel power source VDD in the row ra1 and the row r2. The voltage increases with an increase in the distance from the row ra1 and the row r2, and the voltage approaches the voltage VDDH.

Here, the distance between the row r2-1 and the row ra2 and the distance between the row r2 and the row ra1 are substantially equal. Therefore, the influence of the voltage drop of the pixel power source VDD near the row ra2 on the voltage of the pixel power source VDD near the row r2-1 just before time t9 and the influence of the voltage drop of the pixel power source VDD near the row ra1 on the voltage of the pixel power source VDD near the row r2 at time t9 are substantially equal. Thus, the distribution of the voltage of the pixel power source VDD near the row r2-1 just before time t9 and the distribution of the voltage of the pixel power source VDD near the row r2 at time t9 are substantially equal, and the fluctuation of the pixel power source VDD of the read row on the short-accumulation side is reduced. As a result, the reset level of the short-accumulation signals of the row r2-1 and the reset level of the short-accumulation signals of the row r2 are substantially equal, and the generation of the horizontal axis of the short-accumulation frame illustrated in FIG. 6 is reduced.

Note that in the case where the address jump occurs on the short-accumulation side at time t5, the voltage fluctuation of the pixel power source VDD of the read row on the long-accumulation side is also reduced for a similar reason, and the degradation of the image quality can be reduced.

7. Fifth Embodiment

Next, a fifth embodiment of the present technique will be described with reference to FIG. 14.

Figure 14:
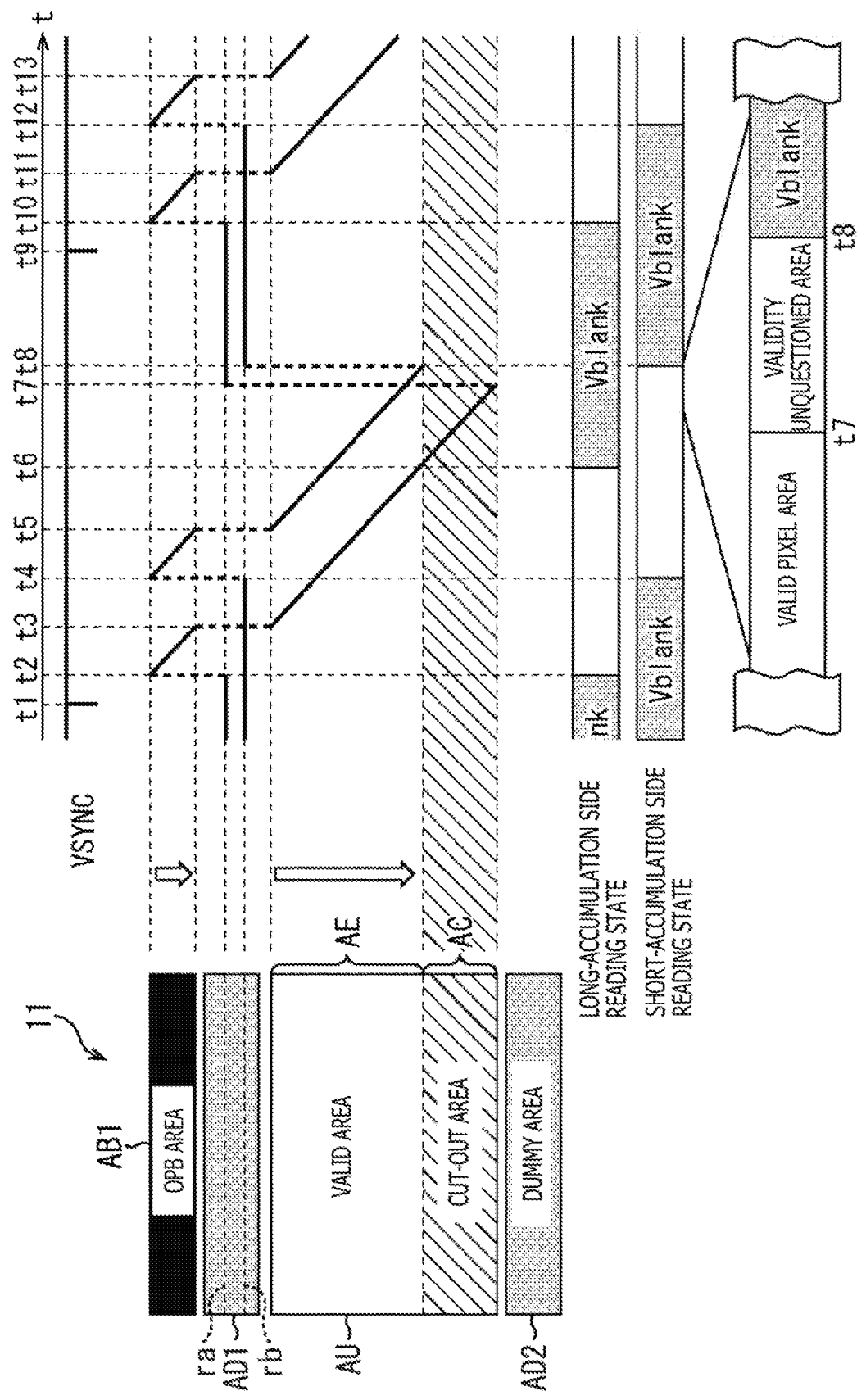
FIG. 14 is a diagram for describing a fifth embodiment of the present technique.

A diagram on the left side of FIG. 14 schematically illustrates an arrangement example of the pixel area 11 of the imaging element 10 as in the diagram on the left side of FIG. 9. The arrangement example of FIG. 14 is different from the arrangement example of FIG. 9 in that a cut-out area AC is arranged below the usable area AU, and the rest of the area is arranged in the valid area AE. The cut-out area AC is a type of unused area not used for the image, and for example, reading of the pixel signals of the cut-out area AC can be skipped to speed up the read scan and speed up the frame rate. Furthermore, although not illustrated, the validity unquestioned area AEn described with reference to FIG. 2 is arranged on the periphery of the valid area AE.

A diagram on the right side of FIG. 14 illustrates a timing chart of read scans on the long-accumulation side and the short-accumulation side as in the diagram on the right side of FIG. 9.

In a period from time t1 to time t5, a process similar to the process in the period from time t1 to time t5 of FIG. 11 is executed.

At time t6, the long-accumulation signals of the last row of the valid area AE are read, and the read scan of the long-accumulation signals of the valid area AE is finished. Subsequently, the read scan of the pixel signals is started from the top row of the cut-out area AC, and the V blank period on the long-accumulation side is started.

At time t7, the read row of the short-accumulation signals moves into the validity unquestioned area AEn at the lower end of the valid area AE. Then, after the read row of the short-accumulation signals is moved into the validity unquestioned area AEn, the pixel signals of the last row of the cut-out area AC are read on the long-accumulation side, and the read scan of the pixel signals of the cut-out area AC is finished. Subsequently, the reading of the dummy signals of the row ra of the dummy area AD1 is started on the long-accumulation side.

In this case, the address jump occurs on the long-accumulation side. On the other hand, the short-accumulation signals in the validity unquestioned area AEn are read on the short-accumulation side, and the read short-accumulation signals are not used for the image. Therefore, the image quality is not affected.

At time t8, the short-accumulation signals of the last row of the valid area AE are read on the short-accumulation side, and the read scan of the short-accumulation signals of the valid area AE is finished. Subsequently, the reading of the dummy signals of the row rb of the dummy area AD1 is started on the short-accumulation side, and the V blank period is started.

In this case, although the address jump occurs on the short-accumulation side, the dummy signals are read on the long-accumulation side, and the image quality is not affected.

Next, at time t9, the vertical synchronization signal VSYNC is input to the control circuit 17, and a new vertical period is started. Subsequently, a process similar to the process from time t1 to time t9 is repeatedly executed.

In this way, the movement of the read row on the long-accumulation side and the short-accumulation side is controlled such that the address jump is performed on one side when the dummy signals or the pixel signals in the validity unquestioned area AEn are read on the other side, and the address jump is not performed on one side when the pixel signals in the valid pixel area AEp or the OPB area AB1 are read on the other side. This can prevent the degradation of the image quality caused by the voltage fluctuation of the pixel power source VDD associated with the address jump.

Furthermore, the reading of the pixel signals of the cut-out area AC is skipped on the short-accumulation side, and the read time period per frame is reduced. As a result, the frame rate can be speeded up, for example.

8. Sixth Embodiment

Next, a sixth embodiment of the present technique will be described with reference to FIG. 15.

Figure 15:
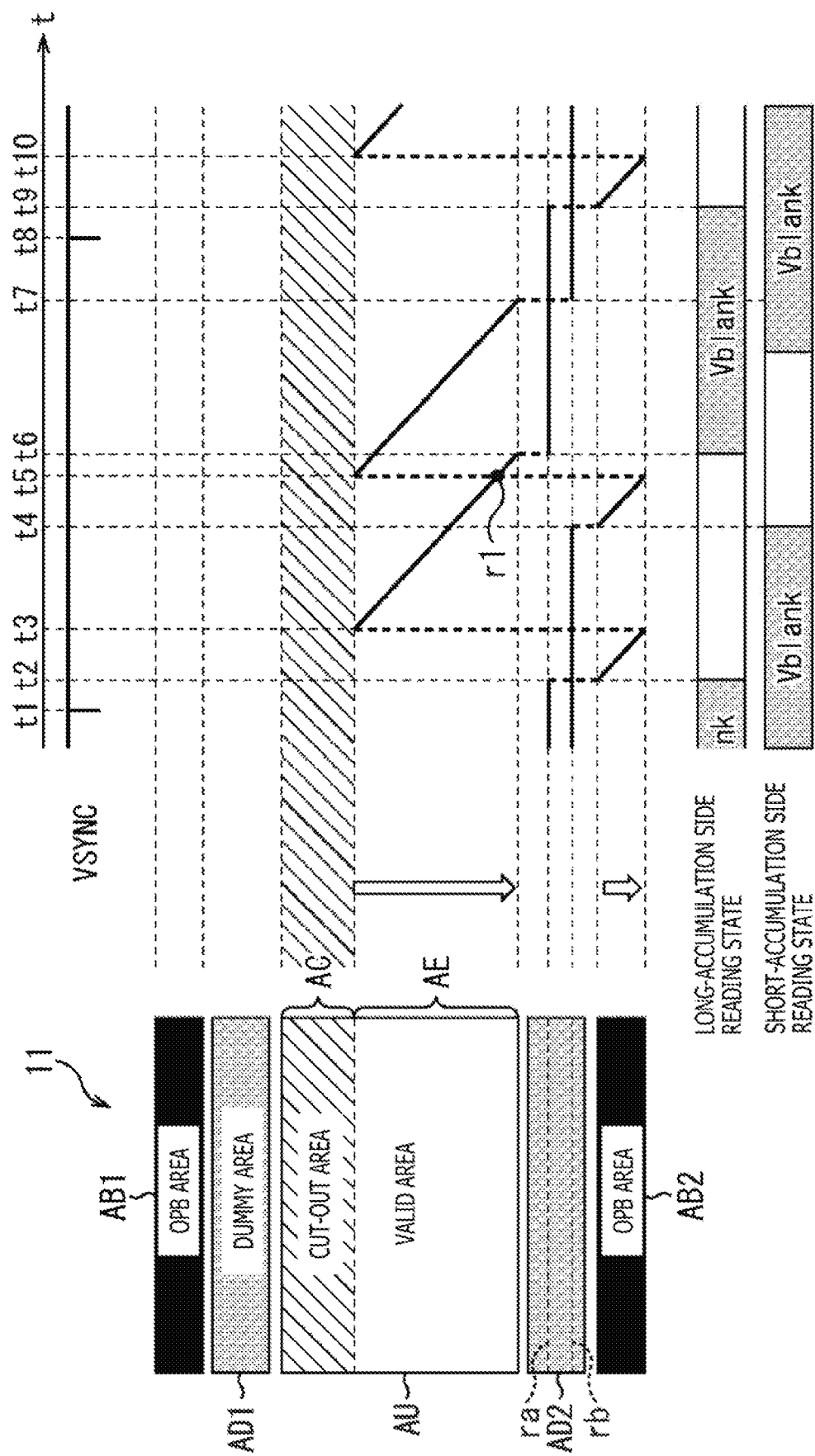
FIG. 15 is a diagram for describing a sixth embodiment of the present technique.

A diagram on the left side of FIG. 15 schematically illustrates an arrangement example of the pixel area 11 of the imaging element 10 as in the diagram on the left side of FIG. 10. The arrangement example of FIG. 15 is different from the arrangement example of FIG. 10 in that the cut-out area AC is arranged above the usable area AU, and the rest of the area is arranged in the valid area AE. Furthermore, although not illustrated, the validity unquestioned area AEn described with reference to FIG. 2 is arranged on the periphery of the valid area AE.

A diagram on the right side of FIG. 15 illustrates a timing chart of read scans on the long-accumulation side and the short-accumulation side as in the diagram on the right side of FIG. 10.

At time t1, the vertical synchronization signal VSYNC is input to the control circuit 17, and a new vertical period is started. In this case, the dummy signals of the row ra in the dummy area AD2 are read on the long-accumulation side, and the dummy signals of the row rb in the dummy area AD2 are read on the short-accumulation side.

At time t2, the V blank period ends on the long-accumulation side, and the read scan of the black level signals is started from the top row of the OPB area AB2.

Subsequently, the read scan of the black level signals of the OPB area AB2 in the forward direction is sequentially performed at predetermined time intervals on the long-accumulation side. Then, after the black level signals of the last row of the OPB area AB2 are read, and the read scan of the black level signals of the OPB area AB2 is finished, the read scan of the long-accumulation signals is started from the top row of the valid area AE at time t3.

In this case, although the address jump occurs on the long-accumulation side, the dummy signals are read on the short-accumulation side, and the image quality is not affected.

Subsequently, the read scan of the long-accumulation signals of the valid area AE in the forward direction is sequentially performed at predetermined time intervals.

At time t4, the V blank period ends on the short-accumulation side, and the read scan of the black level signals is started from the top row of the OPB area AB2.

In this case, the read row on the short-accumulation side is moved to the OPB area AB2 instead of the OPB area AB1, and this prevents the occurrence of the address jump on the short-accumulation side during the reading of the long-accumulation signals.

Subsequently, the read scan of the black level signals of the OPB area AB2 in the forward direction is sequentially performed at predetermined time intervals on the short-accumulation side. Then, after the black level signals of the last row of the OPB area AB2 are read, and the read scan of the black level signals of the OPB area AB2 is finished, the read scan of the short-accumulation signals is started from the top row of the valid area AE at time t5.

In this case, the address jump occurs on the short-accumulation side. On the other hand, the long-accumulation signals of the row r1 in the valid area AE are read on the long-accumulation side. Here, the distance between the row r1 and the last row of the OPB area AB2 and the distance between the row r1 and the top row of the valid area AE are substantially equal. As a result, the voltage of the pixel power source VDD in the read row on the long-accumulation side hardly fluctuates as described with reference to FIG. 13.

At time t6, the long-accumulation signals of the last row of the valid area AE are read, and the read scan of the long-accumulation signals of the valid area AE is finished. Subsequently, the reading of the dummy signals of the row ra of the dummy area AD2 is started on the long-accumulation side, and the V blank period is started.

In this case, the read row on the long-accumulation side is moved to the dummy area AD2 instead of the dummy area AD1, and this prevents the occurrence of the address jump on the long-accumulation side during the reading of the short-accumulation signals.

At time t7, the short-accumulation signals of the last row of the valid area AE are read, and the read scan of the short-accumulation signals of the valid area AE is finished. Subsequently, the reading of the dummy signals of the row rb of the dummy area AD2 is started on the short-accumulation side, and the V blank period is started.

Next, at time t8, the vertical synchronization signal VSYNC is input to the control circuit 17, and a new vertical period is started. Subsequently, a process similar to the process from time t1 to time t8 is repeatedly executed.

In this way, the address jump is performed on the long-accumulation side when the dummy signals are read on the short-accumulation side, and the address jump is performed on the short-accumulation side at timing that the distance of the read rows on the short-accumulation side and the distance of the read rows on the long-accumulation side are substantially equal after the movement. This can reduce the degradation of the image quality caused by the voltage fluctuation of the pixel power source VDD associated with the address jump.

Furthermore, the reading of the pixel signals of the cut-out area AC is skipped on both the long-accumulation side and the short-accumulation side, and the read time period per frame is reduced. As a result, the frame rate can be speeded up, for example.

9. Seventh Embodiment

Next, a seventh embodiment of the present technique will be described with reference to FIG. 16.

Figure 16:
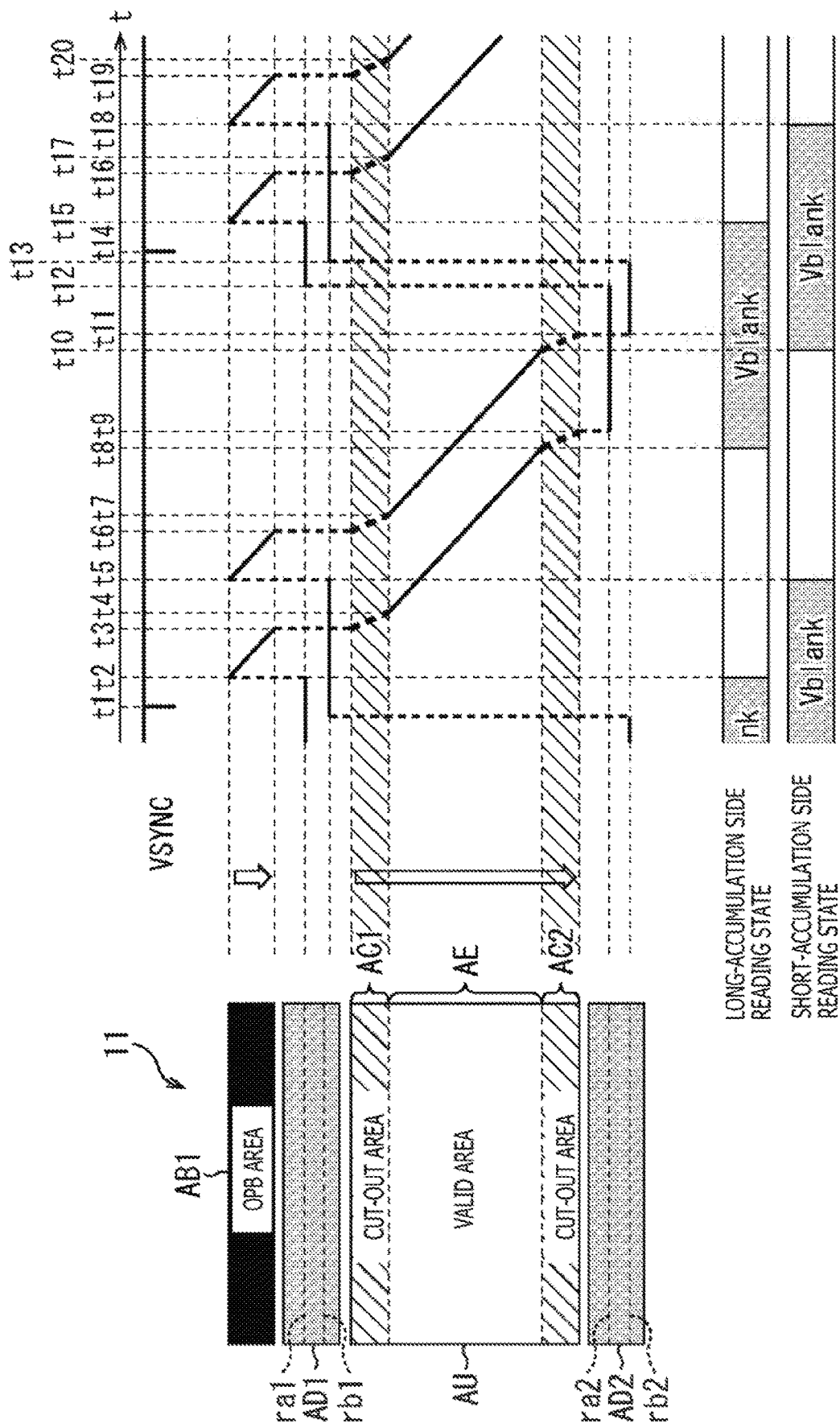
FIG. 16 is a diagram for describing a seventh embodiment of the present technique.

A diagram on the left side of FIG. 16 schematically illustrates an arrangement example of the pixel area 11 of the imaging element 10 as in the diagram on the left side of FIG. 10. The arrangement example of FIG. 16 is different from the arrangement example of FIG. 10 in that a cut-out area AC1 and a cut-out area AC2 are arranged. The cut-out area AC1 is arranged between the dummy area AD1 and the valid area AE (valid pixel area AEp) above the usable area AU. The cut-out area AC2 is arranged between the valid area AE (valid pixel area AEp) and the dummy area AD2 below the usable area AU. Furthermore, although not illustrated, the validity unquestioned area AEn described with reference to FIG. 2 is arranged on the periphery of the valid area AE.

A diagram on the right side of FIG. 16 illustrates a timing chart of the read scans on the long-accumulation side and the short-accumulation side as in the diagram on the right side of FIG. 10.

At time t1, the vertical synchronization signal VSYNC is input to the control circuit 17, and a new vertical period is started. In this case, the dummy signals of the row ra1 in the dummy area AD1 are read on the long-accumulation side, and the dummy signals of the row rb1 in the dummy area AD1 are read on the short-accumulation side.

At time t2, the V blank period ends on the long-accumulation side, and the read scan of the black level signals is started from the top row of the OPB area AB1.

Subsequently, the read scan of the black level signals of the OPB area AB1 in the forward direction is sequentially performed at predetermined time intervals on the long-accumulation side. Then, after the black level signals of the last row of the OPB area AB1 are read, and the read scan of the black level signals of the OPB area AB1 is finished, the read scan of the pixel signals is started from the top row of the cut-out area AC1 at time t3.

Subsequently, the read scan of the pixel signals of the cut-out area AC1 in the forward direction is sequentially performed at predetermined time intervals on the long-accumulation side. Furthermore, in the cut-out area AC1, the read scan is performed faster than in the valid area AE by, for example, reducing the rows for reading the pixel signals or by reading the pixel signals of a plurality of rows at the same time.

Next, after the pixel signals of the last row of the cut-out area AC1 are read, and the read scan of the pixel signals of the cut-out area AC1 is finished, the read scan of the long-accumulation signals is started from the top row of the valid area AE at time t4. Subsequently, the read scan of the long-accumulation signals of the valid area AE in the forward direction is sequentially performed at predetermined time intervals.

At time t5, the V blank period ends on the short-accumulation side, and the read scan of the black level signals is started from the top row of the OPB area AB1.

Subsequently, the read scan of the black level signals of the OPB area AB1 in the forward direction is sequentially performed at predetermined time intervals on the short-accumulation side. Then, after the black level signals of the last row of the OPB area AB1 are read, and the read scan of the black level signals of the OPB area AB1 is finished, the read scan of the pixel signals is started from the top row of the cut-out area AC1 at time t6.

Subsequently, the read scan of the pixel signals of the cut-out area AC1 in the forward direction is sequentially performed at predetermined time intervals on the short-accumulation side. Furthermore, in the cut-out area AC1, the read scan is performed faster than in the valid area AE by, for example, reducing the rows for reading the pixel signals or by reading the pixel signals of a plurality of rows at the same time.

Next, after the pixel signals of the last row of the cut-out area AC1 are read, and the read scan of the pixel signals of the cut-out area AC1 is finished, the read scan of the short-accumulation signals is started from the top row of the valid area AE at time t7. Subsequently, the read scan of the short-accumulation signals of the valid area AE in the forward direction is sequentially performed at predetermined time intervals.

Here, for example, the read scan of the short-accumulation signals of the valid area AE can be abruptly started at time t6 without performing the read scan of the pixel signals of the cut-out area AC1. However, the amount of movement of the read row on the short-accumulation side becomes large in the case where the width of the cut-out area AC1 in the column direction is wide, and the voltage of the pixel power source VDD in the read row on the long-accumulation side significantly fluctuates.

On the other hand, the read scan of the pixel signals of the cut-out area AC1 can be performed to reduce the amount of movement of the read row on the short-accumulation side, and this can reduce the voltage fluctuation of the pixel power source VDD in the read row on the long-accumulation side.

At time t8, the long-accumulation signals of the last row of the valid area AE are read, and the read scan of the long-accumulation signals of the valid area AE is finished. Subsequently, the read scan of the pixel signals is started from the top row of the cut-out area AC2, and the V blank period on the long-accumulation side is started.

Subsequently, the read scan of the pixel signals of the cut-out area AC2 in the forward direction is sequentially performed at predetermined time intervals on the long-accumulation side. Furthermore, in the cut-out area AC2, the read scan is performed faster than in the valid area AE by, for example, reducing the rows for reading the pixel signals or by reading the pixel signals of a plurality of rows at the same time.

At time t9, the pixel signals of the last row of the cut-out area AC1 are read on the long-accumulation side, and the read scan of the pixel signals of the cut-out area AC1 is finished. Subsequently, the reading of the dummy signals of the row ra2 of the dummy area AD2 is started on the long-accumulation side.

Here, for example, the reading of the dummy signals of the row ra2 of the dummy area AD2 can be abruptly started at time t8 without performing the read scan of the pixel signals of the cut-out area AC2. However, the amount of movement of the read row on the long-accumulation side becomes large in the case where the width of the cut-out area AC2 in the column direction is wide, and the voltage of the pixel power source VDD in the read row on the short-accumulation side significantly fluctuates.

On the other hand, the read scan of the pixel signals of the cut-out area AC2 can be performed to reduce the amount of movement of the read row on the long-accumulation side, and this can reduce the voltage fluctuation of the pixel power source VDD in the read row on the short-accumulation side.

At time t10, the short-accumulation signals of the last row of the valid area AE are read, and the read scan of the short-accumulation signals of the valid area AE is finished. Subsequently, the read scan of the pixel signals is started from the top row of the cut-out area AC2, and the V blank period on the short-accumulation side is started.

Subsequently, the read scan of the pixel signals of the cut-out area AC2 in the forward direction is sequentially performed at predetermined time intervals on the short-accumulation side. Furthermore, in the cut-out area AC2, the read scan is performed faster than in the valid area AE by, for example, reducing the rows for reading the pixel signals or by reading the pixel signals of a plurality of rows at the same time.

At time t11, the pixel signals of the last row of the cut-out area AC1 are read on the short-accumulation side, and the read scan of the pixel signals of the cut-out area AC1 is finished. Subsequently, the reading of the dummy signals of the row rb2 of the dummy area AD2 is started on the short-accumulation side.

At time t12, the read row on the long-accumulation side moves from the row ra2 in the dummy area AD2 to the row ra1 in the dummy area AD1.

In this case, although the address jump occurs on the long-accumulation side, the dummy signals are read on the short-accumulation side, and the image quality is not affected.

At time t13, the read row on the short-accumulation side moves from the row rb2 in the dummy area AD2 to the row rb1 in the dummy area AD1.

In this case, although the address jump occurs on the short-accumulation side, the dummy signals are read on the long-accumulation side, and the image quality is not affected.

Next, the vertical synchronization signal VSYNC is input to the control circuit 17 at time t14, and a new vertical period is started. Subsequently, a process similar to the process from time t1 to time t14 is repeatedly executed.

In this way, the movement of the read row on the long-accumulation side and the short-accumulation side is controlled such that the address jump is performed on one side when the dummy signals are read on the other side, and the address jump is not performed on one side when the pixel signals in the valid area AE or the OPB area AB1 are read on the other side. This can prevent the degradation of the image quality caused by the voltage fluctuation of the pixel power source VDD associated with the address jump.

Furthermore, the read scan of the pixel signals of the cut-out areas AC1 and AC2 is speeded up to reduce the read time period per frame. As a result, the frame rate can be speeded up, for example.

10. Modifications

Hereinafter, modifications of the embodiments of the present technique will be described.
{Modification Related to Reading Method of Pixel Signals}

Figure 17:
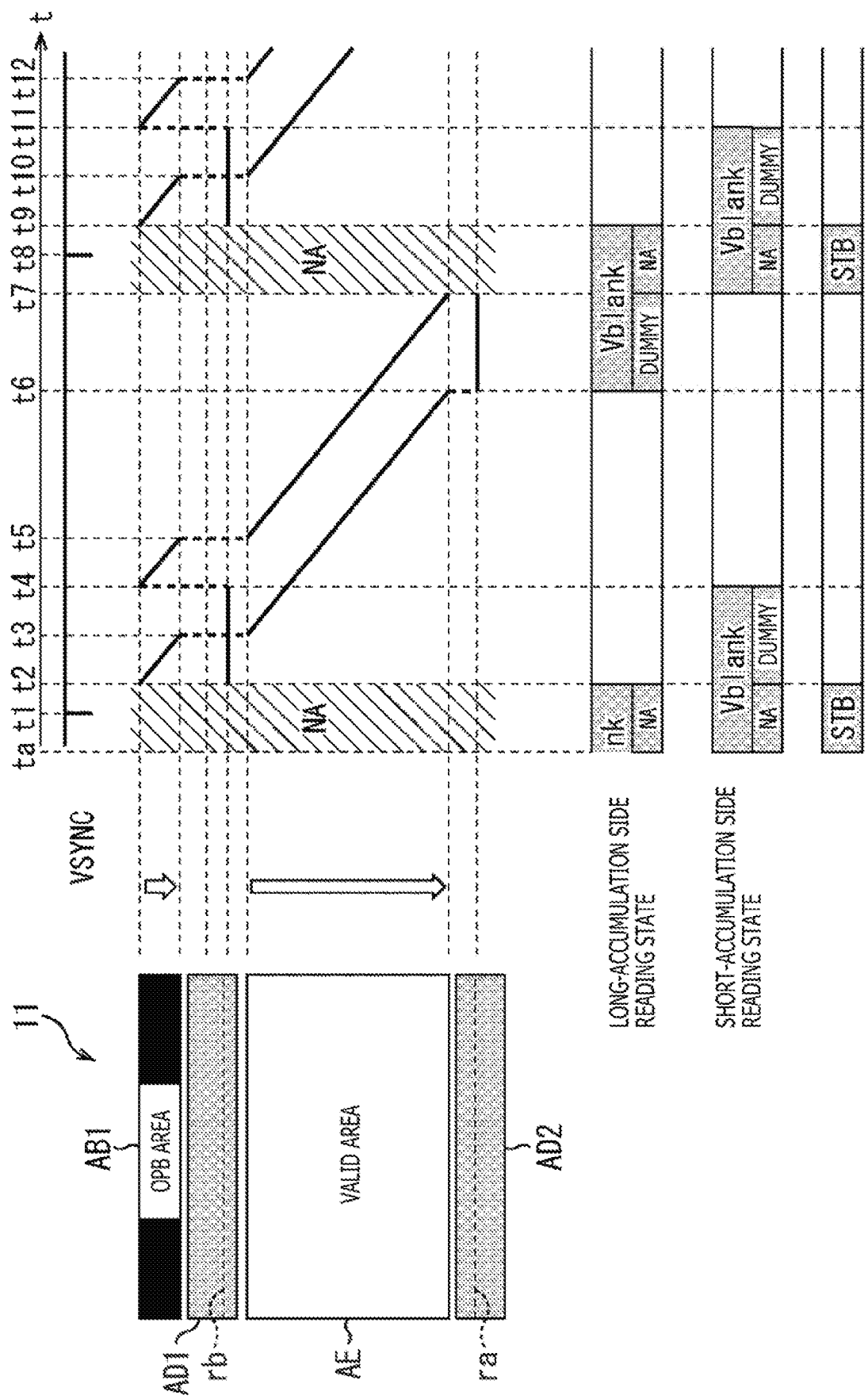
FIG. 17 is a diagram for describing an example of pausing reading of the pixel signals.

For example, the reading of the pixel signals can be stopped in a period in which the V blank periods on the long-accumulation side and the short-accumulation side overlap. For example, the V blank periods on the long-accumulation side and the short-accumulation side overlap in a period from time to to time t2 and a period from time t7 to time t9 in the first embodiment as illustrated in FIG. 17. Therefore, the reading of the pixel signals (dummy signals) may be stopped on the long-accumulation side and the short-accumulation side in the periods. In addition to the stop of the reading of the pixel signals, analog circuits and the like related to the AD conversion can also be set to a standby state. This can reduce the power consumption of the imaging element 10.

Furthermore, the configuration of FIG. 3 is an example of a configuration that can read the pixel signals of two rows all at once in one horizontal period, and other configurations can also be used. Here, other examples of the configuration that allow reading the pixel signals of two rows all at once in one horizontal period will be described with reference to FIGS. 18 to 21. Note that in FIGS. 18, 20, and 21, the same reference symbols are provided to the parts corresponding to FIG. 3.

Figure 18:
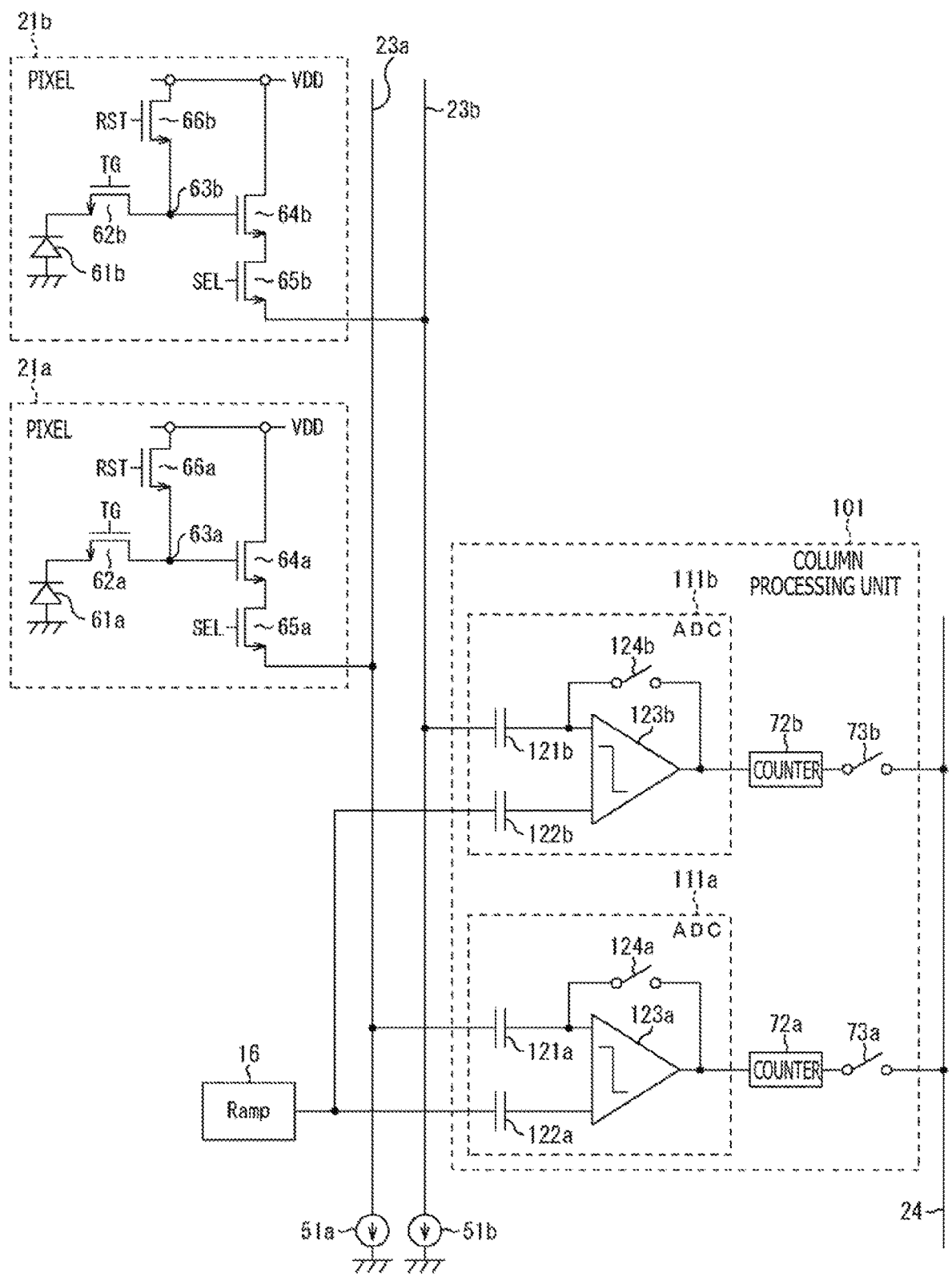
FIG. 18 is a block diagram illustrating a second configuration example of the pixels and the column processing unit.

The example of FIG. 18 is different from the example of FIG. 3 in that a column processing unit 101 is provided in place of the column processing unit 51.

The column processing unit 101 includes AD converters (ADCs) 111a and 111b, counters 72a and 72b, and output switches 73a and 73b.

The ADC 111a includes capacitors 121a and 122a, a comparator 123a, and a feedback switch 124a.

An input terminal on a negative side of the comparator 123a is connected to the first vertical signal line 23a through the capacitor 121a. An input terminal on a positive side of the comparator 123a is connected to the ramp signal generation circuit 16 through the capacitor 122a. An output terminal of the comparator 123a and the input terminal on the negative side are connected through the feedback switch 124a.

The comparator 123a compares the magnitude of a ramp signal input to the input terminal on the positive side and a pixel signal input to the input terminal on the negative side and outputs a comparison result signal indicating the comparison result. For example, the comparator 123a outputs a comparison result signal in a high level in the case where the ramp signal is larger than the analog pixel signal and outputs a comparison result signal in a low level in the case where the ramp signal is equal to or smaller than the analog pixel signal.

Similar to the counter 72 of FIG. 3, the counter 72a converts an analog pixel signal output from the pixel 21a into a digital value.

The output switch 73a opens and closes according to a drive signal output from the horizontal drive circuit 14. For example, the output switch 73a is first turned on according to the drive signal output from the horizontal drive circuit 14 at the timing of output of a pixel signal in the column provided with a predetermined column processing unit 101, and an output terminal of the counter 72a is connected to the output signal line 24. As a result, a pixel signal of the pixel 21a after AD conversion by the column processing unit 101 is output to the output signal line 24.

Similar to the ADC 111a, the ADC 111b includes capacitors 121b and 122b, a comparator 123b, and a feedback switch 124b. Therefore, the components of the ADC 111b operate similarly to the components of the ADC 111a described above, and the detailed description will not be repeated.

Note that as described later, the ADC 111a and the ADC 111b can operate in parallel.

In addition, the counter 72b and the output switch 73b operate similarly to the counter 72a and the output switch 73a described above, and the detailed description will not be repeated.

Note that, when appropriate, the ADC 111a and the ADC 111b will be simply referred to as ADC 111 in the case where the ADC 111a and the ADC 111b do not have to be distinguished, and the components of the ADC 111 will also be referred to in a similar way. In addition, when appropriate, the counter 72a and the counter 72b will be simply referred to as counter 72 in the case where the counter 72a and the counter 72b do not have to be distinguished. Furthermore, when appropriate, the output switch 73a and the output switch 73b will be simply referred to as output switch 73 in the case where the output switch 73a and the output switch 73b do not have to be distinguished.

Next, an example of a reading method of the pixel signals of the imaging element 10 in the case where the column processing unit 101 is provided will be described with reference to FIG. 19.

Figure 19:
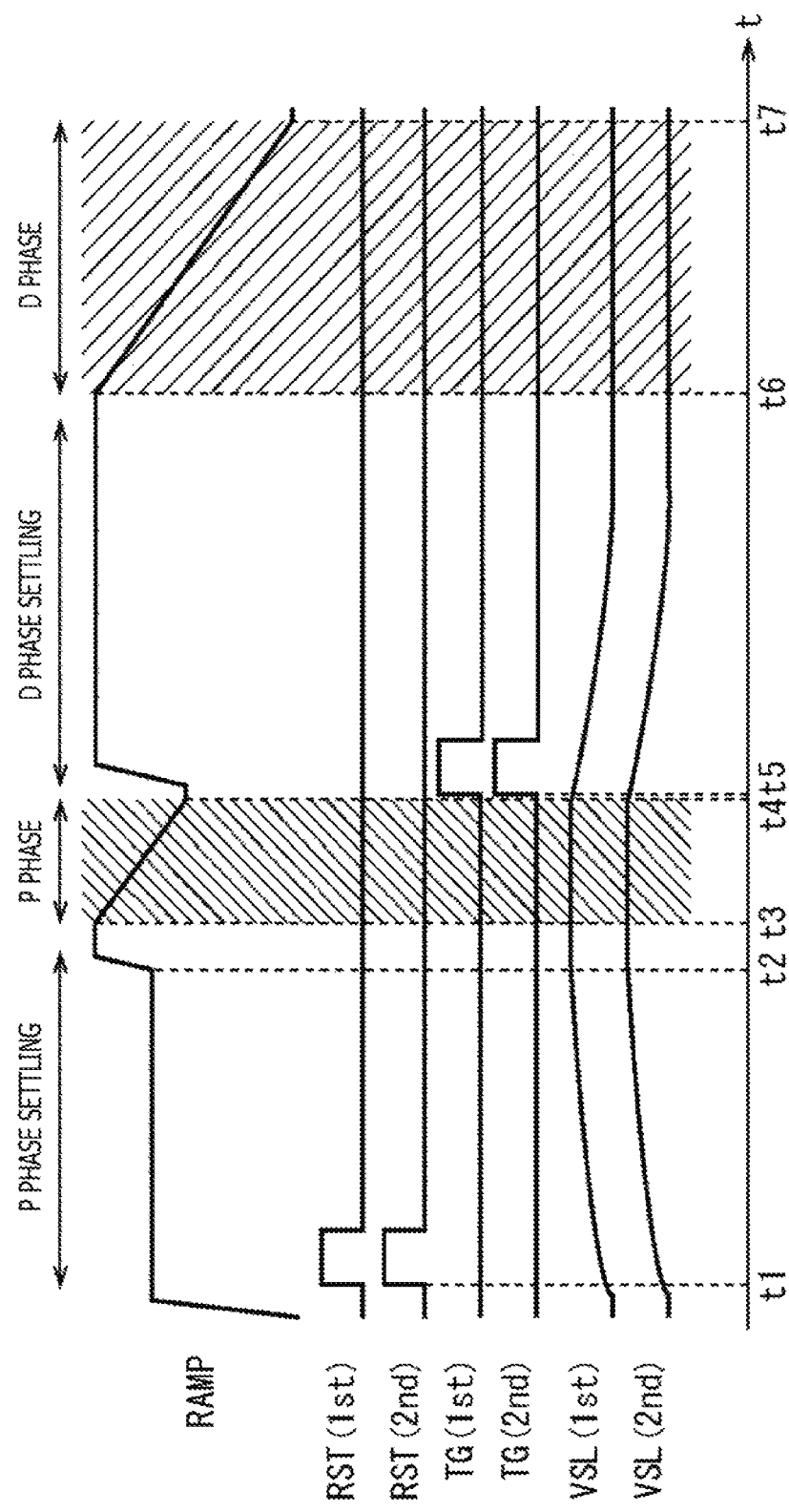
FIG. 19 is a timing chart for describing a second example of the reading method of the image signals in one horizontal period.

FIG. 19 is a timing chart illustrating time-series transition of each signal in one horizontal period. The horizontal axis indicates the time axis. FIG. 19 illustrates transition of a ramp signal input from the ramp signal generation circuit 16 to the comparators 123a and 123b, a reset signal RST and a transfer signal TG input to the pixel 21a, a reset signal RST and a transfer signal TG input to the pixel 21b, a voltage VSL of the first vertical signal line 23a, and a voltage VSL of the second vertical signal line 23b.

Note that in FIG. 19, the pixel 21a is referred to as a first (1st) pixel, and the pixel 21b is referred to as a second (2nd) pixel. In addition, the reset signal RST and the transfer signal TG input to the pixel 21a are referred to as RST (1st) and TG (1st), and the reset signal RST and the transfer signal TG input to the pixel 21b are referred to as RST (2nd) and TG (2nd). Furthermore, the voltage VSL of the first vertical signal line 23a is referred to as VSL (1st), and the voltage VSL of the second vertical signal line 23b is referred to as VSL (2nd).

At time t1, the reset signal RST (1st) is input to the reset transistor 66a of the pixel 21a, and the FD unit 63a is reset. The reset signal RST (2nd) is further input to the reset transistor 66b of the pixel 21b, and the FD unit 63b is reset.

The P phase is then settled in the column processing unit 101 in a period from time t1 to time t3.

Then, after the feedback switches 124a and 124b are once turned on at time t1 and turned off at time t2, the ramp signal starts to drop at time t3. Subsequently, AD conversion of the pixel signal of the pixel 21a in the reset level (P phase) input through the first vertical signal line 23a is performed in a period from time t3 to time t4. The digital value of the pixel signal of the pixel 21a in the reset level is held in the counter 72a.

AD conversion of the pixel signal of the pixel 21b in the reset level (P phase) input through the second vertical signal line 23b is also performed. The digital value of the pixel signal of the pixel 21b in the reset level is held in the counter 72b.

At time t5, the transfer signal TG (1st) is input to the transfer transistor 62a of the pixel 21a, and the charge accumulated in the PD 61a is transferred to the FD unit 63a. The transfer signal TG (2nd) is also input to the transfer transistor 62b of the pixel 21b, and the charge accumulated in the PD 61b is transferred to the FD unit 63b.

The D phase is then settled in the column processing unit 101 in a period from time t5 to time t6.

At time t6, the ramp signal starts to drop. AD conversion of the pixel signal of the pixel 21a in the signal level (D phase) input through the first vertical signal line 23a is then performed in a period from time t6 to time t7. AD conversion of the pixel signal of the pixel 21b in the signal level (D phase) input through the second vertical signal line 23b is also performed.

The output switch 73a is then turned on, and a digital pixel signal that is a difference between the pixel signal of the pixel 21a in the signal level and the pixel signal in the reset level is output from the counter 72a to the output signal line 24. In addition, after the output switch 73a is turned off, the output switch 73b is turned on, and a digital pixel signal that is a difference between the pixel signal of the pixel 21b in the signal level and the pixel signal in the reset level is output from the counter 72b to the output signal line 24. Subsequently, the output switch 73b is turned off.

In this way, each column processing unit 101 of the column signal processing circuit 13 can read the pixel signals of the pixels 21 of two different rows all at once in one horizontal period while executing the CDS processing.

Figure 20:
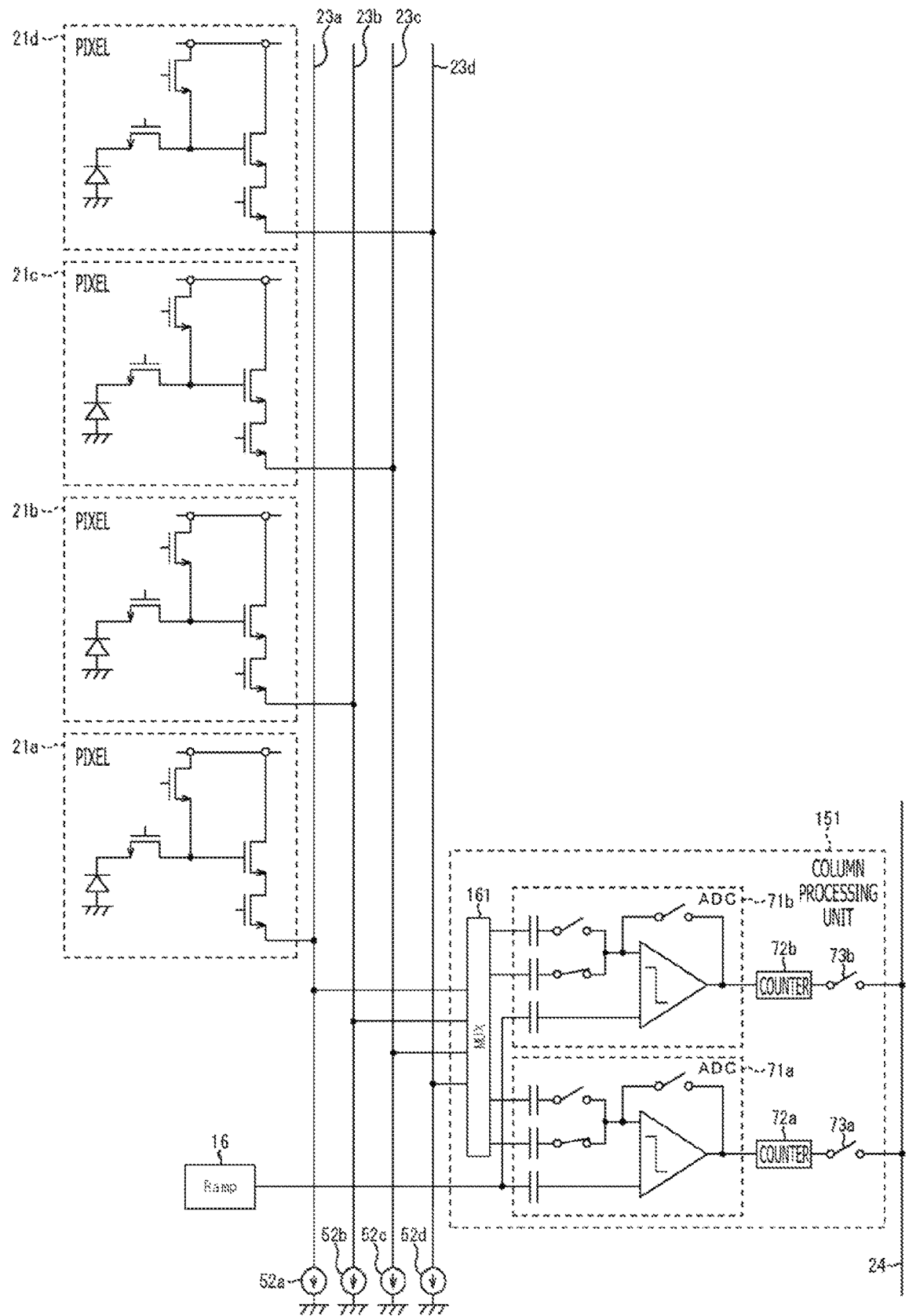
FIG. 20 is a block diagram illustrating a third configuration example of the pixels and the column processing unit.

FIG. 20 illustrates a configuration example of the pixels 21 and a column processing unit 151 of the imaging element 10. Note that the example of FIG. 20 is different from the example of FIG. 3 in that the column processing unit 151 is provided in place of the column processing unit 51.

FIG. 20 also illustrates four pixels 21a to 21d arranged in different rows of the same column among the plurality of pixels 21 arranged in the pixel area 11 of FIG. 1. FIG. 20 further illustrates the column processing unit 151 arranged in association with the column among the plurality of column processing units 151 included in the column signal processing circuit 13.

In the example, four vertical signal lines, that is, first to fourth vertical signal lines 23a to 23b, are provided for one column of the pixels 21. The pixel 21a (for example, pixel 21 of (4i)th row (i is a natural number)) is connected to the first vertical signal line 23a, and the pixel 21b (for example, pixel 21 of (4i+1)th row (i is a natural number)) is connected to the second vertical signal line 23b. The pixel 21c (for example, pixel 21 of (4i+2)th row (i is a natural number)) is connected to the third vertical signal line 23c, and the pixel 21d (for example, pixel 21 of (4i+3)th row (i is a natural number)) is connected to the fourth vertical signal line 23d.

Note that the reference symbols in the pixels 21a to 21d are not illustrated to facilitate the understanding of the drawing.

In addition, a constant current source 52a of a source follower circuit is connected to the first vertical signal line 23a, and a constant current source 52b of a source follower circuit is connected to the second vertical signal line 23b. A constant current source 52c of a source follower circuit is connected to the third vertical signal line 23c, and a constant current source 52d of a source follower circuit is connected to the fourth vertical signal line 23d. Furthermore, the first to fourth vertical signal lines 23a to 23d are connected to one column processing unit 151 arranged in association with the column.

The column processing unit 151 is different from the column processing unit 51 of FIG. 3 in that two sets of combinations of the ADC, the counter, and the output switch, that is, an ADC 71a, a counter 72a, and an output switch 73a and an ADC 71b, a counter 72b, and an output switch 73b, are provided, and a multiplexer (MUX) 161 is added.

Note that the reference symbols in the ADCs 71a and 71b are not illustrated to facilitate the understanding of the drawings. Furthermore, a character "a" is provided behind the reference symbol of each component of the ADC 71a, and a character "b" is provided behind the reference symbol of each component of the ADC 71b.

An input unit of the MUX 161 is connected to the first to fourth vertical signal lines 23a to 23d, and an output unit of the MUX 161 is connected to capacitors 81-1a and 81-2a of the ADC 71a and capacitors 81-1a and 81-2a of the ADC 71b. The MUX 161 can select arbitrary two of the first to fourth vertical signal lines 23a to 23d to connect to the ADC 71a. More specifically, the ADC 71a can be individually connected to the vertical signal lines 23a to 23d through the MUX 161 and input switches 82-1a and 82-2a. The MUX 161 can also select arbitrary two of the first to fourth vertical signal lines 23a to 23d to connect to the ADC 71b. More specifically, the ADC 71b can be individually connected to the vertical signal lines 23a to 23d through the MUX 161 and input switches 82-1b and 82-2b.

Therefore, the degree of freedom in the order, the combination, the timing, and the like of the AD conversion of the pixel signals of the pixels 21a to 21d in the column processing unit 151 is higher than in the column processing unit 51. For example, in the case of performing the read scans of the long-accumulation signals and the short-accumulation signals in parallel, the degree of freedom in the order, the combination, the timing, and the like of reading the long-accumulation signals and the short-accumulation signals from the pixels 21 increases.

Figure 21:
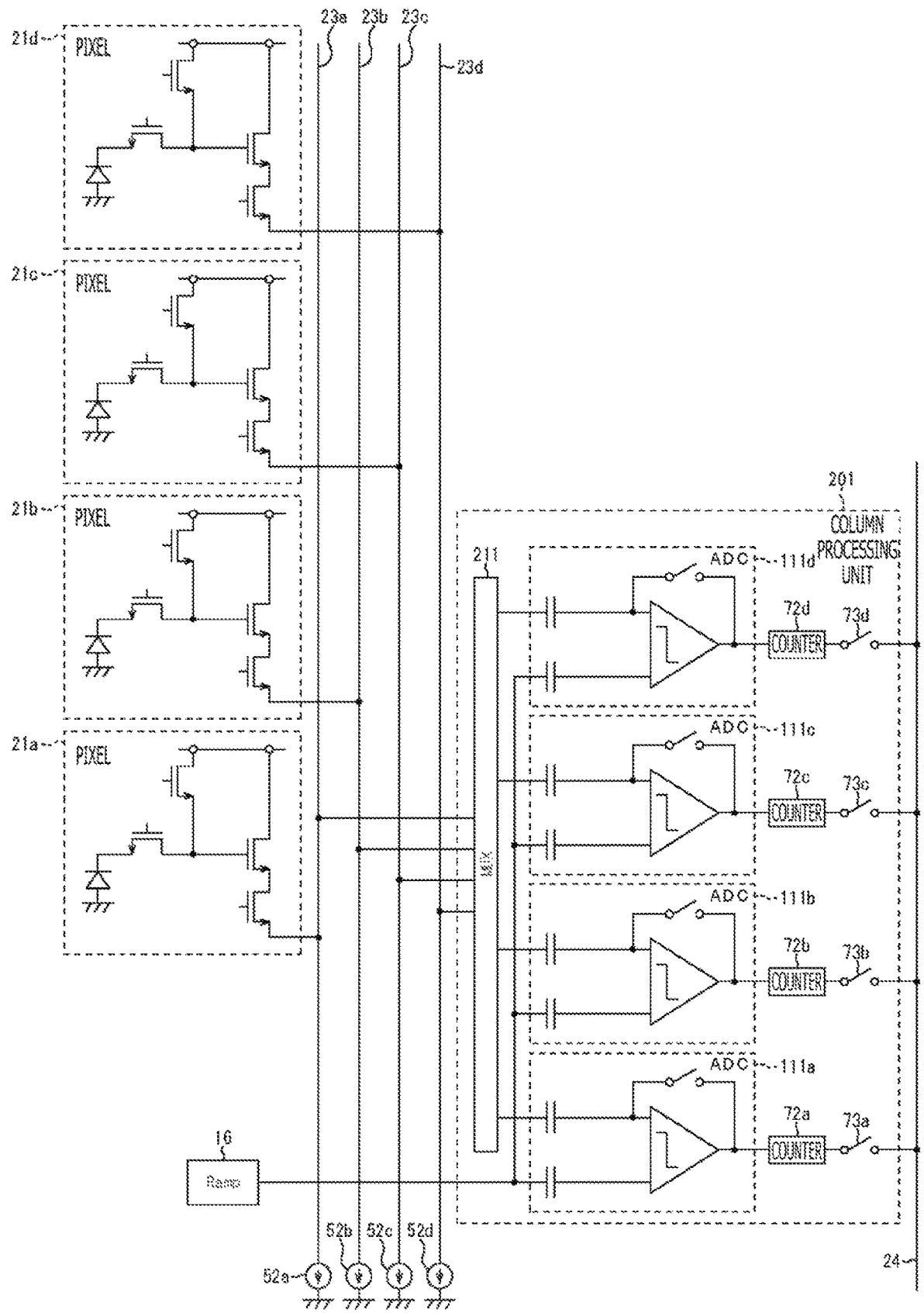
FIG. 21 is a block diagram illustrating a fourth configuration example of the pixels and the column processing unit.

FIG. 21 illustrates a configuration example of the pixels 21 and a column processing unit 201 of the imaging element 10. Note that in FIG. 21, the same reference symbols are provided to the parts corresponding to FIGS. 18 to 20.

The example of FIG. 21 is different from the example of FIG. 18 in that the column processing unit 201 is provided in place of the column processing unit 101.

FIG. 21 also illustrates four pixels 21a to 21d arranged in different rows of the same column among the plurality of pixels 21 arranged in the pixel area 11 of FIG. 1. FIG. 20 further illustrates the column processing unit 201 arranged in association with the column among the plurality of column processing units 201 included in the column signal processing circuit 13.

In the example, four vertical signal lines, that is, first to fourth vertical signal lines 23a to 23b, are provided for one column of the pixels 21. The pixel 21a (for example, pixel 21 of (4i)th row (i is a natural number)) is connected to the first vertical signal line 23a, and the pixel 21b (for example, pixel 21 of (4i+1)th row (i is a natural number)) is connected to the second vertical signal line 23b. The pixel 21c (for example, pixel 21 of (4i+2)th row (i is a natural number)) is connected to the third vertical signal line 23c, and the pixel 21d (for example, pixel 21 of (4i+3)th row (i is a natural number)) is connected to the fourth vertical signal line 23d.

Note that the reference symbols in the pixels 21a to 21d are not illustrated to facilitate the understanding of the drawing.

In addition, a constant current source 52a of a source follower circuit is connected to the first vertical signal line 23a, and a constant current source 52b of a source follower circuit is connected to the second vertical signal line 23b. A constant current source 52c of a source follower circuit is connected to the third vertical signal line 23c, and a constant current source 52d of a source follower circuit is connected to the fourth vertical signal line 23d. Furthermore, the first to fourth vertical signal lines 23a to 23d are connected to one column processing unit 201 arranged in association with the column.

The column processing unit 201 is different from the column processing unit 101 of FIG. 18 in that four sets of combinations of the ADC, the counter, and the output switch are provided, and a multiplexer (MUX) 211 is added.

Note that the reference symbols in ADCs 111a to 111d are not illustrated to facilitate the understanding of the drawings. Furthermore, a character "a" is provided behind the reference symbol of each component of the ADC 111a, and a character "b" is provided behind the reference symbol of each component of the ADC 111b. A character "c" is provided behind the reference symbol of each component of the ADC 111c, and a character "d" is provided behind the reference symbol of each component of the ADC 111d.

An input unit of the MUX 211 is connected to the first to fourth vertical signal lines 23a to 23d, and an output unit of the MUX 211 is connected to a capacitor 121a of the ADC 111a, a capacitor 121b of the ADC 111b, a capacitor 121c of the ADC 111c, and a capacitor 121d of the ADC 111d. Then, the MUX 211 can be connected to the ADCs 111a to 111d on the basis of an arbitrary combination of the first to fourth vertical signal lines 23a to 23d.

Therefore, the degree of freedom in the order, the combination, the timing, and the like of the AD conversion of the pixel signals of the pixels 21a to 21d in the column processing unit 201 is higher than in the column processing unit 101. For example, in the case of performing the read scans of the long-accumulation signals and the short-accumulation signals in parallel, the degree of freedom in the order, the combination, the timing, and the like of reading the long-accumulation signals and the short-accumulation signals from the pixels 21 increases.

Furthermore, the pixel signals of three or more rows may be read all at once in one horizontal period.

For example, three or more vertical signal lines 23 can be wired to each column of the pixels 21 in the example of FIG. 3, and a set of the capacitor 81 and the input switch 82 can be provided for each of the vertical signal lies 23. As a result, the pixel signals of three or more rows can be read all at once in one horizontal period.

In addition, for example, three or more vertical signal lines 23 can be wired to each column of the pixels 21 in the example of FIG. 18, and a set of the ADC 111, the counter 72, and the output switch 73 can be provided for each of the vertical signal lines 23. As a result, the pixel signals of three or more rows can be read all at once in one horizontal period.

Furthermore, the pixel signals of four rows at most can be read all at once in one horizontal period in the example of FIG. 20.

Note that three or more read scans can be executed in parallel in the case where the pixel signals of three or more rows are read all at once in one horizontal period. In the case where three or more read scans are executed in parallel, the timing of the address jump of each read scan can also be controlled on the basis of the positions of the read rows of the other read scans as in the case described above.

For example, in the case of the address jump of the read scan A during three or more read scans, the address jump of the read scan A can be performed at a timing that each read row of the other read scans satisfies one of the following conditions 1 and 2.

1. The read row is not in the valid pixel area AEp or the OPB detection area ABd.

2. The distance between the read row and the read row of the read scan A before the movement by the address jump and the distance between the read row and the read row of the read scan A after the movement are substantially equal.

For example, in the case where all of the read rows of the other read scans satisfy the condition 1 or the condition 2 at the end of the read scan of the valid area AE of the read scan A, the read row of the read scan A can be moved to one of the dummy areas AD closer to the row where the scan of the valid area AE is started. On the other hand, in the case where at least one of the read rows of the other read scans satisfies neither the condition 1 nor the conditions 2, the read row of the read scan A can be moved to one of the dummy areas AD closer to the row where the scan of the valid area AE is finished.

Furthermore, for example, in the case where all of the read rows of the other read scans satisfy the condition 1 or the condition 2 at the start of the detection of the black level of the read scan A, the read row of the read scan A can be moved to one of the OPB areas AB closer to the row where the scan of the valid area AE is started. On the other hand, in the case where at least one of the read rows of the other read scans satisfies neither the condition 1 nor the condition 2, the read row of the read scan A can be moved to one of the OPB areas AB closer to the dummy area including the read row of the read scan A at the time.

{Other Modifications}

Other than the examples described above, the present technique can also be generally applied to imaging elements capable of performing a plurality of read scans in parallel.

For example, the present technique can be applied to an imaging element that performs a plurality of read scans in parallel regardless of the number of times that the pixel signal of each pixel is read in one vertical period. Specifically, the present technique can be applied to, for example, an imaging element that separately includes pixels for long-time exposure and pixels for short-time exposure and that performs a read scan of long-accumulation signals and a read scan of short-accumulation signals in parallel while reading the pixel signal of each pixel once in each vertical period. The present technique can also be applied to, for example, an imaging element that performs a plurality of read scans in parallel while reading the pixel signal of each pixel once in each vertical period with the same exposure time period for each pixel, thereby speeding up the read time period.

Furthermore, the present technique can be applied to, for example, both a front-illuminated CMOS image sensor that receives light on a front side including a wiring layer laminated over a semiconductor substrate provided with the pixels 21 and a back-illuminated CMOS image sensor that receives light on a back side that is a side opposite the front side. The present technique can also be applied to a multi-layer CMOS image sensor, in which a sensor substrate provided with the pixels 21 and a circuit board provided with the control circuit (FIG. 1) and the like are laminated.

{Example of Application to Electronic Device}

Note that the imaging element 10 of each embodiment described above can be applied to, for example, various electronic devices, such as a digital still camera, a digital video camera, other imaging systems, a mobile phone with an imaging function, and other devices with imaging functions.

Figure 22:
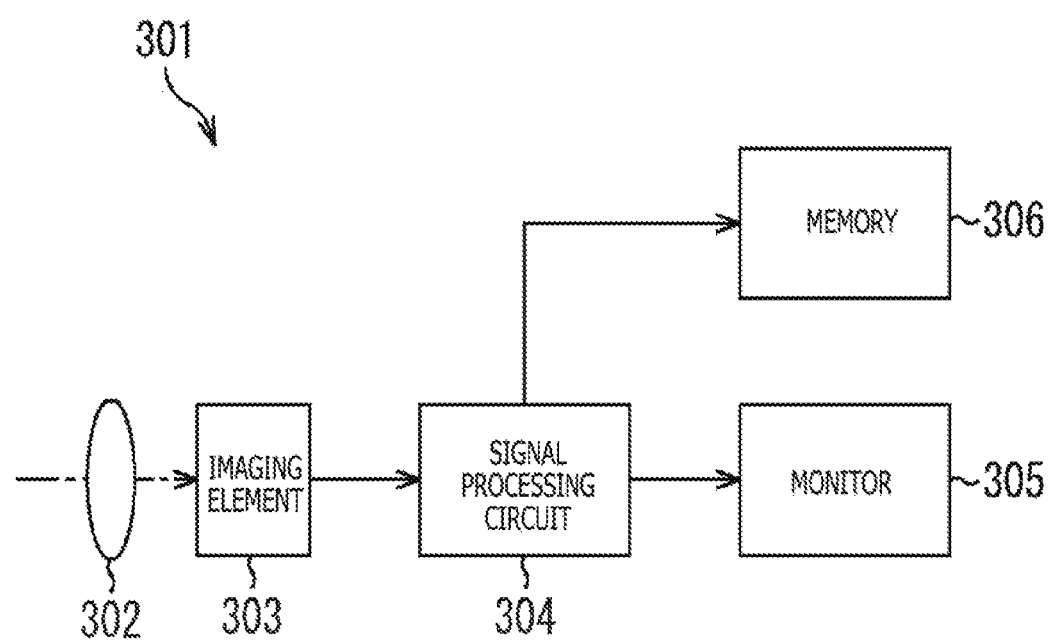
FIG. 22 is a block diagram illustrating a configuration example of an embodiment of an imaging apparatus according to the present technique.

FIG. 22 is a block diagram illustrating a configuration example of an imaging apparatus mounted on an electronic device.

As illustrated in FIG. 22, an imaging apparatus 301 includes an optical system 302, an imaging element 303, a signal processing circuit 304, a monitor 305, and a memory 306, and the imaging apparatus 301 can take still images and moving images.

The optical system 302 includes one or a plurality of lenses and guides image light (incident light) from the subject to the imaging element 303 to form an image on a light receiving surface (sensor unit) of the imaging element 303.

The imaging element 10 of each embodiment described above is applied as the imaging element 303. Electrons are accumulated in the imaging element 303 for a certain period according to the image formed on the light receiving surface through the optical system 302. Signals corresponding to the electrons accumulated in the imaging element 303 are then supplied to the signal processing circuit 304.

The signal processing circuit 304 applies various types of signal processing to the pixel signals output from the imaging element 303. The image (image data) obtained by the execution of the signal processing by the signal processing circuit 304 is supplied and displayed on the monitor 305 or supplied and stored (recorded) in the memory 306.

In the imaging apparatus 301 configured in this way, the imaging element 10 of each embodiment described above can be applied to take an image with a wide dynamic range and high image quality.

{Usage Examples of Image Sensor}

Figure 23:
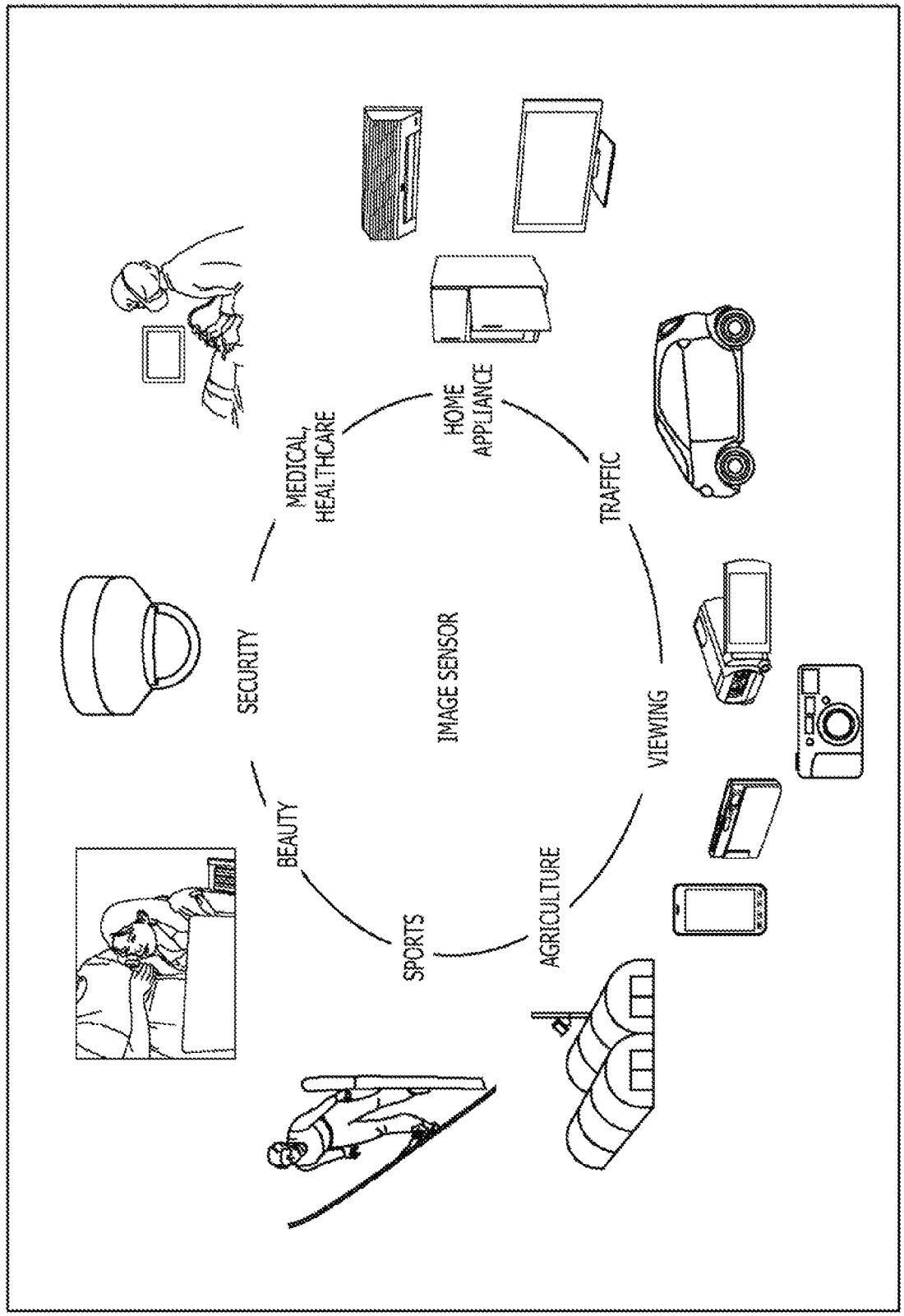
FIG. 23 depicts a usage example of using an image sensor.

FIG. 23 depicts usage examples of using the image sensor (imaging element 10).

The image sensor described above can be used, for example, in various cases of sensing light, such as visible light, infrared light, ultraviolet light, and X rays, as follows.

An apparatus that takes images to be viewed, such as a digital camera and a mobile device with a camera function.

An apparatus used for traffic, such as an on-board sensor that takes images of the front, back, surroundings, or inside of a car, a monitoring camera that monitors traveling vehicles or roads, and a distance measurement sensor that measures the distance between vehicles and the like, for safe drive like automatic stop or for recognizing the state of the driver.

An apparatus used as a home appliance, such as a television, a refrigerator, and an air conditioner, that takes an image of a gesture of the user to perform device operation according to the gesture.

An apparatus used for medical care or healthcare, such as an endoscope and an apparatus that takes images of blood vessels by receiving infrared light.

An apparatus used for security, such as a monitoring camera for crime prevention and a camera for personal authentication.

An apparatus used for beauty, such as a skin measurement device that takes images of the skin and a microscope that takes images of the scalp.

An apparatus used for sports, such as an action camera and a wearable camera for sports and the like.

An apparatus used for agriculture, such as a camera that monitors the state of the farm or produce.

Note that the system in the present specification denotes a set of a plurality of constituent elements (apparatuses, modules (components), and the like), and whether or not all of the constituent elements are in the same housing does not matter. Therefore, a plurality of apparatuses stored in separate housings and connected through a network and an apparatus storing a plurality of modules in one housing are both systems.

In addition, the embodiments of the present technique are not limited to the embodiments described above, and various changes can be made without departing from the scope of the present technique.

Furthermore, the advantageous effects described in the present embodiments are illustrative only and not limiting, and there can be other advantageous effects.

The present technique can also be configured, for example, as follows.

(1)

An imaging element including:

a pixel area including a plurality of pixels arranged in a matrix;

a vertical drive circuit that drives the pixels in the pixel area row-by-row; and a column signal processing circuit that can read pixel signals of a plurality of rows in the pixel area in one horizontal period, in which the vertical drive circuit performs two or more read scans of the pixel signals in the pixel area in parallel and controls a timing of moving a read row of each read scan by equal to or more than a predetermined amount of movement on the basis of a position of a read row of another read scan.

(2)

The imaging element according to (1), in which the vertical drive circuit controls the movement of the read row of each read scan by equal to or more than the predetermined amount of movement to perform the movement in a case where the read row of the other read scan is not in one of a first area used for an image in the pixel area and a second area used to detect a black level or in a case where a distance between the read row before the movement and the read row of the other read scan and a distance between the read row after the movement and the read row of the other read scan are substantially equal.

(3)

The imaging element according to (2), in which a third area for adjusting a read load of the pixel signals is arranged on each of both sides of the first area in the pixel area in a column direction, and the vertical drive circuit selects, from the plurality of the third areas, a destination of the read row of each read scan in a case of adjusting the read load of the pixel signals, on the basis of the position of the read row of the other read scan.

(4)

The imaging element according to (3), in which a fourth area not used for the image is arranged between the first area and each of the third areas, and the vertical drive circuit controls the read scan in the fourth area to perform the read scan faster than the read scan in the first area.

(5)

The imaging element according to any one of (2) to (4), in which the second area is arranged on each of both sides of the first area in the pixel area in the column direction, and the vertical drive circuit selects an area to be used to detect the black level of each read scan from the plurality of second areas on the basis of the position of the read row of the other read scan.

(6)

The imaging element according to any one of (1) to (5), in which the vertical drive circuit performs a plurality of times of exposure with different exposure time periods in one vertical period and controls read scans of a plurality of pixel signals obtained by the plurality of times of exposure to perform the read scans in parallel.

(7)

The imaging element according to (6), in which the vertical drive circuit performs long-time exposure and short-time exposure in one vertical period, controls a read scan of pixel signals obtained by the long-time exposure and a read scan of pixel signals obtained by the short-time exposure to perform the read scans in parallel, and controls a timing of movement of a read row of one of the read scans by equal to or more than a predetermined amount of movement on the basis of a position of a read row of the other read scan.

(8)

The imaging element according to any one of (1) to (7), in which a plurality of vertical signal lines are wired to each column in the pixel area, and the column signal processing circuit includes, in each column of the pixel area, one or more AD converters that can be individually connected to the plurality of vertical signal lines.

(9)

The imaging element according to any one of (1) to (8), in which a plurality of vertical signal lines are wired to each column in the pixel area, and the column signal processing circuit includes, in each of the vertical signal lines, AD converters that can operate in parallel.

(10)

A driving method of an imaging element, the driving method including:

performing two or more read scans of pixel signals in a pixel area in parallel, the pixel area including a plurality of pixels arranged in a matrix, and controlling a timing of moving a read row of each read scan by equal to or more than a predetermined amount of movement on the basis of a position of a read row of another read scan.

(11)

An electronic device including:

an imaging element including a pixel area including a plurality of pixels arranged in a matrix, a vertical drive circuit that drives the pixels in the pixel area row-by-row, and a column signal processing circuit that can read pixel signals of a plurality of rows in the pixel area in one horizontal period, in which the vertical drive circuit performs two or more read scans of the pixel signals in the pixel area in parallel and controls a timing of moving a read row of each read scan by equal to or more than a predetermined amount of movement on the basis of a position of a read row of another read scan.

REFERENCE SIGNS LIST

10 Imaging element, 11 Pixel area, 12 Vertical drive circuit, 13 Column signal processing circuit, 14 Horizontal drive circuit, 15 Output circuit, 16 Ramp signal generation circuit, 17 Control circuit, 21 Pixel, 22 Horizontal signal line, 23, 23a to 23d Vertical signal lines, 51 Column processing unit, 71, 71a, 71b AD converters, 72, 72a, 72b Counters, 73, 73a, 73b Output switches, 82-1, 82-2 Input switches, 84 Comparator, 101 Column processing unit, 111a, 111b AD converters, 123a, 123b Comparators, 151 Column processing unit, 161 multiplexer, 201 Column processing unit, 211 Multiplexer, 301 Imaging apparatus, 303 Imaging element, AB, AB1, AB2 Optical black areas, ABd OPB detection area, ABn OPB unquestioned area, AC, AC1, AC2 Cut-out areas, AD, AD1, AD2 Dummy areas, AE Valid area, AEp Valid pixel area, AEn Validity unquestioned area, AN Invalid area, AU Usable area

The invention claimed is:

1. An imaging element comprising:
a pixel area including a plurality of pixels arranged in a matrix;
a vertical drive circuit that drives the pixels in the pixel area row-by-row; and
a column signal processing circuit that can read pixel signals of a plurality of rows in the pixel area in one horizontal period, wherein
the vertical drive circuit performs two or more read scans of the pixel signals in the pixel area in parallel and controls a timing of moving a read row of each read scan by equal to or more than a predetermined amount of movement on the basis of a position of a read row of another read scan,
the vertical drive circuit controls the movement of the read row of each read scan by equal to or more than the predetermined amount of movement to perform the movement in a case where the read row of the other read scan is not in one of a first area used for an image in the pixel area and a second area used to detect a black level or in a case where a distance between the read row before the movement and the read row of the other read scan and a distance between the read row after the movement and the read row of the other read scan are substantially equal,
a third area for adjusting a read load of the pixel signals is arranged on each of both sides of the first area in the pixel area in a column direction, and
the vertical drive circuit selects, from the plurality of the third areas, a destination of the read row of each read scan in a case of adjusting the read load of the pixel signals, on the basis of the position of the read row of the other read scan.

2. The imaging element according to claim 1, wherein
a fourth area not used for the image is arranged between the first area and each of the third areas, and
the vertical drive circuit controls the read scan in the fourth area to perform the read scan faster than the read scan in the first area.

3. The imaging element according to claim 1, wherein
the second area is arranged on each of both sides of the first area in the pixel area in the column direction, and
the vertical drive circuit selects an area to be used to detect the black level of each read scan from the plurality of second areas on the basis of the position of the read row of the other read scan.

4. The imaging element according to claim 1, wherein
the vertical drive circuit performs a plurality of times of exposure with different exposure time periods in one vertical period and controls read scans of a plurality of pixel signals obtained by the plurality of times of exposure to perform the read scans in parallel.

5. The imaging element according to claim 4, wherein
the vertical drive circuit performs long-time exposure and short-time exposure in one vertical period, controls a read scan of pixel signals obtained by the long-time exposure and a read scan of pixel signals obtained by the short-time exposure to perform the read scans in parallel, and controls a timing of movement of a read row of one of the read scans by equal to or more than a predetermined amount of movement on the basis of a position of a read row of the other read scan.

6. The imaging element according to claim 1, wherein
a plurality of vertical signal lines are wired to each column in the pixel area, and
the column signal processing circuit includes, in each column of the pixel area, one or more AD converters that can be individually connected to the plurality of vertical signal lines.

7. The imaging element according to claim 1, wherein
a plurality of vertical signal lines are wired to each column in the pixel area, and
the column signal processing circuit includes, in each of the vertical signal lines, AD converters that can operate in parallel.

8. A driving method of an imaging element, the driving method comprising:
performing two or more read scans of pixel signals in a pixel area in parallel, the pixel area including a plurality of pixels arranged in a matrix, and
controlling a timing of moving a read row of each read scan by equal to or more than a predetermined amount of movement on the basis of a position of a read row of another read scan, at least by:
controlling movement of the read row of each read scan by equal to or more than the predetermined amount of movement to perform the movement in a case where the read row of the other read scan is not in one of a first area used for an image in the pixel area and a second area used to detect a black level or in a case where a distance between the read row before the movement and the read row of the other read scan and a distance between the read row after the movement and the read row of the other read scan are substantially equal, wherein a third area for adjusting a read load of the pixel signals is arranged on each of both sides of the first area in the pixel area in a column direction, and selecting, from the plurality of the third areas, a destination of the read row of each read scan in a case of adjusting the read load of the pixel signals, on the basis of the position of the read row of the other read scan.

9. An electronic device comprising:
an imaging element including
   a pixel area including a plurality of pixels arranged in a matrix,
   a vertical drive circuit that drives the pixels in the pixel area row-by-row, and
   a column signal processing circuit that can read pixel signals of a plurality of rows in the pixel area in one horizontal period, wherein
      the vertical drive circuit performs two or more read scans of the pixel signals in the pixel area in parallel and controls a timing of moving a read row of each read scan by equal to or more than a predetermined amount of movement on the basis of a position of a read row of another read scan,
      the vertical drive circuit controls the movement of the read row of each read scan by equal to or more than the predetermined amount of movement to perform the movement in a case where the read row of the other read scan is not in one of a first area used for an image in the pixel area and a second area used to detect a black level or in a case where a distance between the read row before the movement and the read row of the other read scan and a distance between the read row after the movement and the read row of the other read scan are substantially equal,
      a third area for adjusting a read load of the pixel signals is arranged on each of both sides of the first area in the pixel area in a column direction, and
      the vertical drive circuit selects, from the plurality of the third areas, a destination of the read row of each read scan in a case of adjusting the read load of the pixel signals, on the basis of the position of the read row of the other read scan.

* * * * *